(12) United States Patent
Xiong et al.

(10) Patent No.: US 11,810,361 B2
(45) Date of Patent: Nov. 7, 2023

(54) SITE-BASED CALIBRATION OF OBJECT DETECTION PARAMETERS

(71) Applicant: Western Digital Technologies, Inc., San Jose, CA (US)

(72) Inventors: Shaomin Xiong, Fremont, CA (US); Toshiki Hirano, San Jose, CA (US); Damien Kah, San Jose, CA (US)

(73) Assignee: Western Digital Technologies, Inc., San Jose, CA (US)

(*) Notice: Subject to any disclaimer, the term of this patent is extended or adjusted under 35 U.S.C. 154(b) by 0 days.

(21) Appl. No.: 17/358,739

(22) Filed: Jun. 25, 2021

(65) Prior Publication Data

US 2022/0414382 A1    Dec. 29, 2022

(51) Int. Cl.
| | |
|---|---|
| *G06V 20/52* | (2022.01) |
| *H04N 7/18* | (2006.01) |
| *G06V 10/98* | (2022.01) |
| *G06V 20/40* | (2022.01) |
| *G06F 18/22* | (2023.01) |
| *H04N 23/51* | (2023.01) |

(52) U.S. Cl.
CPC .............. *G06V 20/52* (2022.01); *G06F 18/22* (2023.01); *G06V 10/98* (2022.01); *G06V 20/41* (2022.01); *H04N 7/183* (2013.01); *H04N 23/51* (2023.01)

(58) Field of Classification Search
CPC ........ G06V 20/52; G06V 10/98; G06V 20/41; G06K 9/6201; H04N 7/183; H04N 5/2252
See application file for complete search history.

(56) References Cited

U.S. PATENT DOCUMENTS

| | | | |
|---|---|---|---|
| 8,675,065 B2 | 3/2014 | Itoh et al. | |
| 10,127,445 B2 | 11/2018 | Saptharishi et al. | |
| 10,402,697 B2 | 9/2019 | Yang et al. | |
| 10,636,173 B1* | 4/2020 | Beach | G06V 10/751 |
| 2018/0173971 A1* | 6/2018 | Jia | G06N 3/084 |
| 2019/0294889 A1* | 9/2019 | Sriram | G06T 7/292 |
| 2022/0044114 A1* | 2/2022 | Sriram | G06N 3/082 |
| 2022/0066544 A1* | 3/2022 | Kwon | G06F 3/011 |
| 2022/0374635 A1 | 11/2022 | Xiong et al. | |

* cited by examiner

*Primary Examiner* — Nasim N Nirjhar
(74) *Attorney, Agent, or Firm* — PATENT LAW WORKS LLP

(57) ABSTRACT

Systems and methods for site-based calibration of object detection values, such as for surveillance video cameras, are described. Video data from a video image sensor may be processed using an object detector to determine object data and a confidence score for a detected object. The object data and confidence score may be post-processed to apply calibration values based on the camera location to one or more parameters used for determining detection events. Event notifications may be sent for detection events. The calibration values may be determined from a calibration period where a verification object detector is used to verify the object detections and failure analysis is applied to determine calibration values for the camera location.

20 Claims, 8 Drawing Sheets

SITE-BASED CALIBRATION OF OBJECT DETECTION PARAMETERS

TECHNICAL FIELD

The present disclosure generally relates to video surveillance systems and, more particularly, to video surveillance systems for object detection.

BACKGROUND

Network-based video surveillance systems are a growing computing application in both business and personal markets. Some video surveillance systems may include one or more video cameras communicatively connected to a server, such as a network video recorder, through a wired interface, wired or wireless local area network, or wired or wireless wide area network, such as the internet. As video is recorded by the cameras, it is forwarded to the server system where it is stored and/or analyzed for subsequent retrieval. Client or user systems are communicatively connected to the server system to request, receive, and display streams of recorded video data and/or related alerts and analytics.

An increasing number of video surveillance systems are using smart video cameras or otherwise moving compute resources to edge devices in the system, rather than relying solely on a network video recorder appliance or cloud-based processing. For example, some video cameras may be configured with processors, memory, and storage resources far exceeding those needed to convert signals from video image and/or audio sensors into a desired video format for transmission to the network video recorder. However, even these increased compute resources may be limited by space, cost, and other considerations and are unlikely to match the compute resources available in a network video recorder, let alone cloud-based video processing servers.

It may be advantageous to perform real-time object detection processing of each video stream in a network-based surveillance system. However, the object detectors used for real-time video analysis may be less accurate than other object detection schemes, due to practical limitations on processing resources.

Systems and methods for improving the reliability or accuracy of object detectors in surveillance camera applications may be advantageous. A reliable and efficient way of calibrating object detectors for use by an individual camera installed in a camera location for detection of specific objects of interest, particularly without having to modify or retrain the object detection model itself, may be needed.

SUMMARY

Various aspects for on-site calibration of object detection parameters for improving the accuracy of object detection events are described.

One general aspect includes a system including a video image sensor and a surveillance controller configured to: receive video data from the video image sensor, where the video data includes a video stream of video frames captured by the video image sensor at a camera location; determine, using a field object detector: object data for a detected object in the video data; and a confidence score for the detected object. The system also includes post-process the object data and the confidence score to determine a calibrated detection event, where post-processing includes applying at least one calibration value for the camera location to determining the calibrated detection event; and send, responsive to the calibrated detection event, an event notification to a video surveillance application.

Implementations may include one or more of the following features. The system may include a calibration controller configured to: receive, during a calibration period, video data from the video image sensor at the camera location; determine, using an object verification detector, verification object data for a detected calibration object in the video data; determine, based on the verification object data, false object detections determined by the field object detector and missed object detections determined by the field object detector; and determine, based on the false object detections and the missed object detections, the at least one calibration value for post-processing the object data and the confidence score for the detected object during an operating period. The system may include a video camera housing that encloses: the video image sensor; the surveillance controller; and a network interface configured to communicate with a network. The surveillance controller may be further configured to: send, to the calibration controller and over the network, object data from the field object detector and video data from the video image sensor; and receive, from the calibration controller and over the network, the at least one calibration value determined based on the calibration period. The object verification detector may include: a motion model configured to determine a bounding box of moving objects in the video stream; and an image classifier configured to detect an object of interest in the video stream. The calibration controller may be further configured to: compare bounding boxes of moving objects to detected objects from the field object detector; determine whether the object of interest is present in unmatched bounding boxes; and determine, responsive to the object classifier detecting the object of interest in unmatched bounding boxes, missed object detection conditions. The object verification detector may include an image classifier configured to detect an object of interest in the video stream and the calibration controller may be further configured to: determine whether the object of interest is absent in object data from the field object detector; and determine, responsive to the object classifier not detecting the object of interest in the object data from the field object detector, false object detection conditions. The object verification detector may include: a tracking model configured to determine a bounding box of an object of interest in successive frames in the video stream; and an image classifier configured to detect the object of interest in the video stream. The calibration controller may be further configured to: compare bounding boxes in successive frames to detected objects from the field object detector; determine whether the object of interest is present in unmatched bounding boxes; and determine, responsive to the object classifier detecting the object of interest in unmatched bounding boxes, missed object detection conditions. The object verification detector may include a second object detection model configured to determine verification object data for detected objects in the video data and verification confidence scores for the detected objects. The calibration controller may be further configured to: compare verification object data for the detected objects to object data from the field object detector; determine whether verification object data matches object data from the field object detector; determine, responsive to the verification object data including objects of interest not in the object data from the field object detector, missed object detection conditions; and determine, responsive to the object data from the field object detector including objects of interest not in the verification object data, false object detection conditions. The field object detector may use a first object detection model having a first accuracy value for objects of interest, the second object detection model may have a second accuracy value for objects of interest; and the second accuracy value may be higher than the first accuracy value. The calibration controller may be further configured to selectively receive the video data from the video image sensor and object data from the field object detector; the surveillance controller may be further configured to evaluate verification conditions for sending data to the calibration controller; and the verification conditions may be selected from object verification scores from the field object detector meeting a verification threshold and periodic sampling of the video stream. The calibration controller may be further configured to: aggregate missed object detection conditions; aggregate false object detection conditions; determine a set of adjustment conditions associated with the camera location; and determine, based on failure analysis, a plurality of calibration values corresponding to a plurality of adjustment conditions in the set of adjustment conditions. The surveillance controller may be further configured to: determine a current adjustment condition at the camera location; and determine, using the current adjustment condition at the camera location, the at least one calibration value from the plurality of calibration values. The surveillance controller may be further configured to: apply the at least one calibration value to a confidence score threshold; and compare the confidence score for the detected object to the confidence score threshold to determine the calibrated detection event. The surveillance controller may be further configured to: apply the at least one calibration value to a bounding box size threshold; and compare a bounding box size for the detected object to the bounding box size threshold to determine the calibrated detection event. The surveillance controller may be further configured to: apply the at least one calibration value to an intersection-over-union threshold; and compare an intersection-over-union value for the detected object to the intersection-over-union threshold to determine the calibrated detection event. The surveillance controller may be further configured to: apply the at least one calibration value to a motion model sensitivity threshold; and compare a motion value for the detected object to the motion model sensitivity threshold to determine the calibrated detection event. The surveillance controller is further configured to: determine a set of adjustment conditions for the camera location; determine a plurality of calibration values for determining the calibrated detection event; map the set of adjustment conditions to the plurality of calibration values; determine a current adjustment condition at the camera location; and determine, using the current adjustment condition to index the set of adjustment conditions, the at least one calibration value from the plurality of calibration values. The set of adjustment conditions may be selected from condition types including: relative object size; location in video frame; time; light condition; and weather condition.

Another general aspect includes a computer-implemented method including: receiving video data from a video image sensor, where the video data includes a video stream of video frames captured by the video image sensor at a camera location; determining, using a field object detector: object data for a detected object in the video data; and a confidence score for the detected object. The method also includes post-processing the object data and the confidence score to determine a calibrated detection event, where post-processing includes applying at least one calibration value for the camera location to determining the calibrated detection event; and sending, responsive to the calibrated detection event, an event notification to a video surveillance application.

Implementations may include one or more of the following features. The computer-implemented method may include: receiving, during a calibration period, video data from the video image sensor at the camera location; determining, using an object verification detector, verification object data for a detected calibration object in the video data; determining, based on the verification object data, false object detections determined by the field object detector and missed object detections determined by the field object detector; and determining, based on the false object detections and the missed object detections, the at least one calibration value for post-processing the object data and the confidence score for the detected object during an operating period. The computer-implemented method may include: using a second object detection model to determine verification object data for detected objects in the video data and verification confidence scores for the detected objects; comparing verification object data for the detected objects to object data from the field object detector; determine whether verification object data matches object data from the field object detector; determine, responsive to the verification object data including objects of interest not in the object data from the field object detector, missed object detection conditions; and determine, responsive to the object data from the field object detector including objects of interest not in the verification object data, false object detection conditions. The field object detector may use a first object detection model having a first accuracy value for objects of interest; the second object detection model may have a second accuracy value for objects of interest; and the second accuracy value may be higher than the first accuracy value. The computer-implemented method may include: aggregating, during a calibration period, missed object detection conditions; aggregating, during the calibration period, false object detection conditions; determining a set of adjustment conditions associated with the camera location; determining, based on failure analysis of aggregate missed object detection conditions and aggregate false object detection conditions, a plurality of calibration values corresponding to a plurality of adjustment conditions in the set of adjustment conditions; determining a current adjustment condition at the camera location; and determining, using the current adjustment condition at the camera location, the at least one calibration value from the plurality of calibration values. The computer-implemented method may include: applying the at least one calibration value to a post-processing threshold; and comparing a corresponding value for the detected object to the post-processing threshold to determine the calibrated detection event. The post-processing threshold may be selected from: a confidence score threshold; a bounding box size threshold; an intersection-over-union threshold; and a motion model sensitivity threshold.

Still another general aspect includes a video camera including: a video image sensor; means for receiving video data from the video image sensor, where the video data includes a video stream of video frames captured by the video image sensor at a camera location; means for determining, using a field object detector: object data for a detected object in the video data; and a confidence score for the detected object. The camera also includes means for post-processing the object data and the confidence score to determine a calibrated detection event, where post-processing includes applying at least one calibration value for the camera location to determining the calibrated detection event; and means for sending, responsive to the calibrated detection event, an event notification to a video surveillance application.

The various embodiments advantageously apply the teachings of computer-based surveillance systems to improve the functionality of such computer systems. The various embodiments include operations to overcome or at least reduce the issues previously encountered in surveillance systems and, accordingly, are more effective and/or cost-efficient than other surveillance systems. That is, the various embodiments disclosed herein include hardware and/or software with functionality to improve processing of video data by calibrating parameters for post-processing the output of an object detector to increase object detection accuracy for the camera location and use. Accordingly, the embodiments disclosed herein provide various improvements to network-based video surveillance systems.

It should be understood that language used in the present disclosure has been principally selected for readability and instructional purposes, and not to limit the scope of the subject matter disclosed herein.

DETAILED DESCRIPTION

Figure 1:
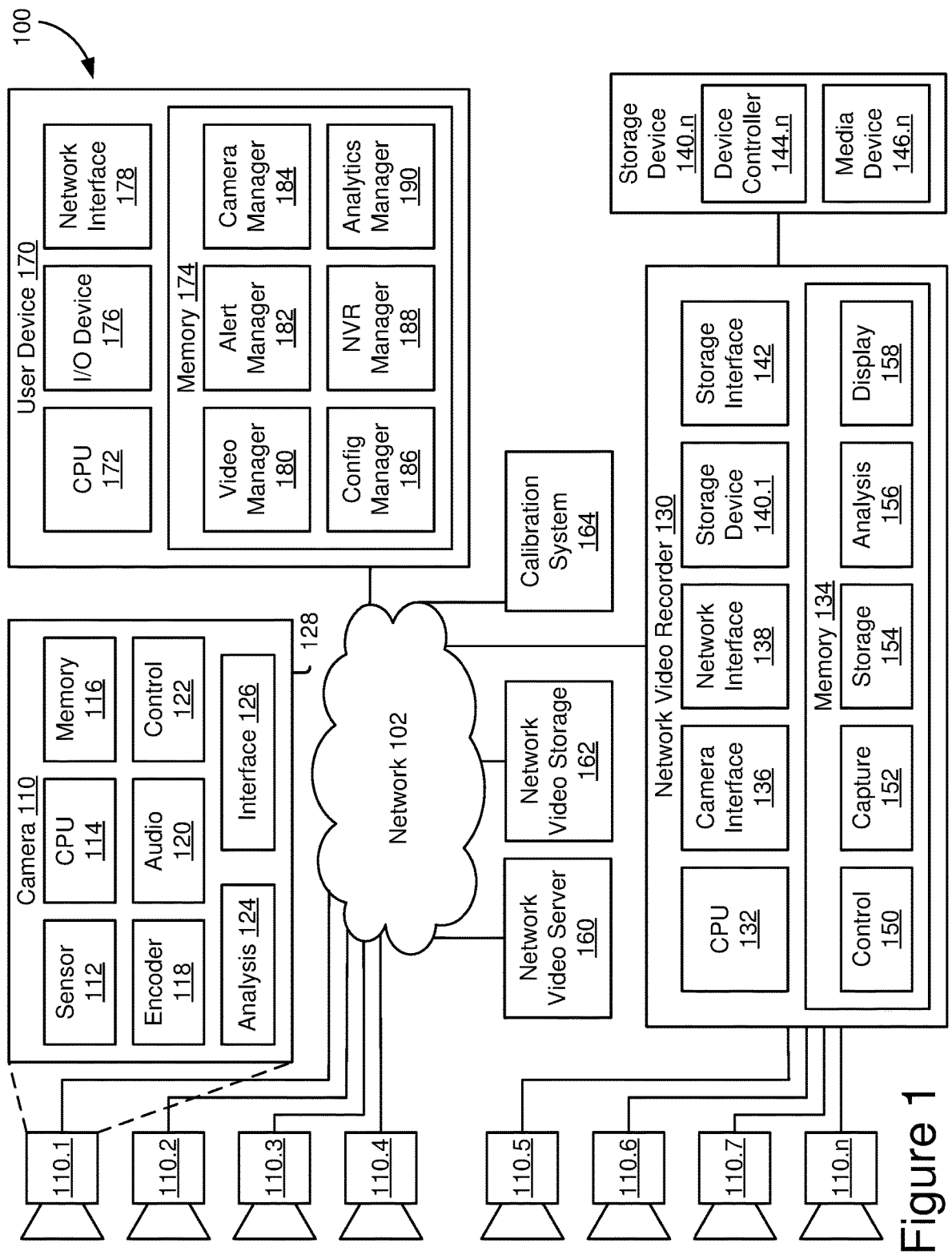
FIG. 1 schematically illustrates a computer-based surveillance system.

FIG. 1 shows an embodiment of an example video surveillance system 100 with multiple video cameras 110 interconnected to a network video recorder 130 for display of surveillance video on user device 170. While some example features are illustrated, various other features have not been illustrated for the sake of brevity and so as not to obscure pertinent aspects of the example embodiments disclosed herein. In some embodiments, cameras 110, network video recorder 130, and user device 170 are computer-based components that may be interconnected by a network 102. Additional components, such as network video server 160 and/or network video storage 162 may also be connected to network 102. In some embodiments, one or more cameras may connect directly to network video recorder 130, such as cameras 110.5-110.n in FIG. 1, without communicating through network 102. Similarly, in alternate embodiments (not shown), user device 170 may connect directly to network video recorder 130.

In some embodiments, one or more networks 102 may be used to communicatively interconnect various components of surveillance system 100. For example, each component, such as cameras 110, network video recorder 130, external storage device 140.n, network video server 160, network video storage 162, calibration system 164, and/or user device 170 may include one or more network interfaces and corresponding network protocols for communication over network 102. Network 102 may include a wired and/or wireless network (e.g., public and/or private computer networks in any number and/or configuration) which may be coupled in a suitable way for transferring data. For example, network 102 may include any means of a conventional data communication network such as a local area network (LAN), a wide area network (WAN), a telephone network, such as the public switched telephone network (PSTN), an intranet, the internet, or any other suitable communication network or combination of communication networks. In some embodiments, network 102 may comprise a plurality of distinct networks, subnetworks, and/or virtual private networks (VPN) may be used to limit communications among specific components. For example, cameras 110 may be on a limited access network such that video and control data may only be transmitted between cameras 110 and network video recorder 130, enabling network video recorder 130 to control access to cameras 110 and their video data.

Cameras 110 may include analog or digital cameras connected to an encoder that generates an encoded video stream of time-dependent video frames with a defined resolution, aspect ratio, and video encoding format. In some embodiments, cameras 110 may include internet protocol (IP) cameras configured to encode their respective video streams and stream them over network 102 to network video recorder 130. In some embodiments (not shown), the encoder may reside in network video recorder 130. In some embodiments, cameras 110 may be configured to receive audio data through integrated or connected microphones (not shown) and include embedded and/or synchronized audio streams with their respective video streams. In some embodiments, video cameras 110 may include an image sensor 112, a processor (central processing unit (CPU), a neural processing unit, a vision processing unit, etc.) 114, a memory 116, an encoder 118, an audio channel 120, a control circuit 122, and/or a network interface 126. In some embodiments, video cameras 110 may include onboard analytics, such as a video analysis subsystem 124.

In some embodiments, the components of camera 110 may be configured in one or more processing systems or subsystems and/or printed circuit boards, chips, busses, etc. that are disposed or enclosed in a video camera housing 128. For example, image sensor 112, processor 114, memory 116, encoder 118, audio channel 120, control circuit 122, analysis subsystem 126, and/or a network interface 126 may comprise one or more application-specific integrated circuits (ASICs) mounted within a sealed plastic, metal, or similar housing with an aperture (often integrating a lens) for receiving light and one or more physical interconnects, such as a network port, for receiving power and communicatively coupling with other system components.

In some embodiments, image sensor 112 may include a solid state device configured to capture light waves and/or other electromagnetic waves and convert the light into an image, generally composed of colored pixels. Image sensor 112 may determine a base image size, resolution, bandwidth, depth of field, dynamic range, and other parameters of the video image frames captured. Image sensor 112 may include charged couple device (CCD), complementary metal oxide semiconductor (CMOS), and/or other image sensor devices of various sensor sizes and aspect ratios. In some embodiments, image sensor 112 may be paired with one or more filters, such as infrared (IR) blocking filters, for modifying the light received by image sensor 112 and/or processed by camera 110. For example, an IR blocking filter may be selectively enabled or disabled for different image capture use cases. In some embodiments, one or more video cameras 110 may include more than one image sensor and related video data paths. For example, video camera 110 may include two image sensors, associated lenses, and data paths to the encoding and processing components in video camera 110. In some embodiments, multiple image sensors are supported by the same circuit board and/or processing subsystem containing processor 114, memory 116, encoder 118, audio channel 120, control circuit 122, analysis subsystem 124, and/or network interface 126.

Digital video data from image sensor 112 may be received by processor 114 for (temporary) storage and processing in memory 116 and/or encoding by encoder 118. Processor 114 may include any type of conventional processor or microprocessor that interprets and executes instructions. In some embodiments, processor 114 may include a neural network processor, such as a neural network processor used by analysis subsystem 124 for supporting object recognition or other onboard analysis. Memory 116 may include a random access memory (RAM) or another type of dynamic storage device that stores information and instructions for execution by processor 114 and/or a read only memory (ROM) or another type of static storage device that stores static information and instructions for use by processor 114 and/or any suitable storage element such as a solid state storage element. Memory 116 may store basic input/output system (BIOS), firmware, and/or operating system instructions for initializing and executing the instructions and processes of cameras 110. Encoder 118 may use various possible digital encoding and/or compression formats for encoding the video data generated by image sensor 112 into a time-dependent video stream composed of video frames at a determined frame rate (number of frames per second). In some embodiments, encoder 118 may use a compressed video format to reduce the storage size and network bandwidth necessary for storing and transferring the original video stream. For example, encoder 118 may be configured to encode the video data as joint photographic expert group (JPEG), motion picture expert group (MPEG)-2, MPEG-4, advanced video coding (AVC)/H.264, and/or other video encoding standards or proprietary formats.

Camera 110 may include audio channel 120 configured to capture audio data to be processed and encoded with image data in the resulting video stream. In some embodiments, one or more microphones may be selectively enabled to capture audio data in parallel with the image data captured by image sensor 112. For example, microphone may be configured with an audio sensor that captures sound waves and converts them into a time-based audio data stream. In some embodiments, encoder 118 may include an audio encoder that operates in conjunction with the video encoder to encode a synchronized audio data stream in the video stream. For example, the video format used to by encoder 118 may include one or more audio tracks for encoding audio data to accompany the image data during video stream playback.

Control circuit 122 may include a control circuit for managing the physical position of a camera 110. In some embodiments, camera 110 may be a pan-tilt-zoom (PTZ) camera that is capable of remote directional and zoom control. Control circuit 122 may be configured to receive motion commands through network interface 126 and/or through another interface, such as a dedicated remote-control interface, such short distance infrared signals, Bluetooth, etc. For example, network video recorder 130 and/or user device 170 may be configured to send PTZ commands to control circuit 122, which translates those commands into motor position control signals for a plurality of actuators that control the position of camera 110. In some embodiments, control circuit 122 may include logic for automatically responding to movement or other triggers detected through image sensor 112 to redirect camera 110 toward the source of movement or other trigger. For example, an auto tracking feature may be embodied in firmware that enables the camera to estimate the size and position of an object based on changes in the pixels in the raw video stream from image sensor 112 and adjust the position of the camera to follow the moving object, returning to a default position when movement is no longer detected. Similarly, an auto capture feature may be embodied in firmware that enables the camera to determine and bound an object based on an object detection algorithm and center and zoom on that object to improve image size and quality. In some embodiments, control circuit 122 may include logic for virtual PTZ or ePTZ, which enables a high-resolution camera to digitally zoom and pan to portions of the image collected by image sensor 112, with no physical movement of the camera. In some embodiments, control circuit 122 may include software and one or more application protocol interfaces (APIs) for enabling remote devices to control additional features and capabilities of camera 110. For example, control circuit 122 may enable network video recorder 130, another video camera 110, and/or user device 170 to configure video formats, enable and disable filters, set motion detection, auto tracking, and similar features, and/or initiate video data streaming. In some embodiments, one or more systems may provide PTZ position control signals (and/or PTZ positioning commands converted to PTZ position control signals by control circuit 122) through the API.

In some embodiments, video camera 110 may include video analysis subsystem 124 configured for onboard video analytics. For example, video analysis subsystem 124 may be configured to use processor 114 and memory 116 to execute at least a portion of video analytics for video data captured by video camera 110. In some embodiments, video analysis subsystem 124 may be configured to operate similarly to video analysis subsystem 156 in network video recorder 130, as further described below, and embody one or more analytics engines and/or analytical model libraries. In some embodiments, video analysis subsystem 124 may be configured to support real-time object detection within camera 110 without processing support from network video recorder 130 or network video server 160. For example, video analysis subsystem 124 may receive a video stream (from sensor 112 and/or encoder 118), initiate an object detector to determine whether an object of interest is present in the video data and, if so, return the object's position within the video frame, and post-process the data from the object detector to determine whether an object detection event should be raised to other components in the system.

Network interface 126 may include one or more wired or wireless connections to network 102 and/or a dedicated camera interface of network video recorder 130. For example, network interface 126 may include an ethernet jack and corresponding protocols for IP communication with network video recorder 130. In some embodiments, network interface 126 may include a power over ethernet (PoE) connection with network video recorder 130 or another camera access point. PoE may enable both power for camera 110 and network data to travel on the same wire. In some embodiments, network interface 126 may enable an IP camera to be configured as a network resource with an IP address that is accessible on a LAN, WAN, or the internet. For example, network video recorder 130 and/or user device 170 may be configured to selectively receive video from cameras 110 from any internet-connected location using internet addressing and security protocols.

Network video recorder 130 may include a computer system configured as a video storage device to record the video streams from cameras 110. For example, network video recorder 130 may be configured to receive video streams from each of cameras 110 for storage, analysis, and/or display through user device 170. In some embodiments, cameras 110 may send encoded video streams based on the raw image data collected from their respective image sensors 112, with or without video data compression. A single video stream may be received from each camera 110 and network video recorder 130 may be configured to receive video streams from all connected cameras in parallel, as network bandwidth and processing resources allow.

Network video recorder 130 may include a housing and a bus interconnecting at least one processor 132, at least one memory 134, at least one storage device 140, and at least one interface, such as camera interface 136, network interface 138, and/or storage interface 142. The housing (not shown) may include an enclosure for mounting the various subcomponents of network video recorder 130, locating any physical connectors for the interfaces, and protecting the subcomponents. Some housings may be configured for mounting within a rack system. The bus (not shown) may include one or more conductors that permit communication among the components of network video recorder 130. Processor 132 may include any type of processor or microprocessor that interprets and executes instructions or operations. Memory 134 may include a random access memory (RAM) or another type of dynamic storage device that stores information and instructions for execution by processor 132 and/or a read only memory (ROM) or another type of static storage device that stores static information and instructions for use by processor 132 and/or any suitable storage element.

In some embodiments, network video recorder 130 may include camera interface 136 configured for connection with one or more cameras 110. For example, camera interface 136 may include a plurality of ethernet ports and supporting protocols compatible with PoE standards for connecting to cameras 110.5-110.*n*. In some embodiments, camera interface 136 may include a PoE network switch for providing power to connected cameras and routing data packets to and from cameras 110.5-110.*n*, such as control and video data. In some embodiments, network video recorder 130 may not include a dedicated camera interface 136 and may use network interface 138 for communication with cameras 110 over network 102.

Network interface 138 may include one or more wired or wireless network connections to network 102. Network interface 138 may include a physical interface, such as an ethernet port, and related hardware and software protocols for communication over network 102, such as a network interface card.

Storage devices 140 may include one or more non-volatile memory devices configured to store video data, such as a hard disk drive (HDD), solid state drive (SSD), flash memory-based removable storage (e.g., secure data (SD) card), embedded memory chips, etc. In some embodiments, storage device 140 is, or includes, a plurality of solid-state drives. In some embodiments, network video recorder 130 may include internal storage device 140.1 and expandable storage that enables additional storage devices 140.*n* to be connected via storage interface 142. Each storage device 140 may include a non-volatile memory (NVM) or device controller 144 based on compute resources (processor and memory) and a plurality of NVM or media devices 146 for data storage (e.g., one or more NVM device(s), such as one or more flash memory devices). In some embodiments, a respective data storage device 140 of the one or more data storage devices includes one or more NVM controllers, such as flash controllers or channel controllers (e.g., for storage devices having NVM devices in multiple memory channels). In some embodiments, storage devices 140 may each be packaged in a housing, such as a multi-part sealed housing with a defined form factor and ports and/or connectors for interconnecting with storage interface 142. Storage device 140.1 and each expanded storage devices 140.*n* may be of the same storage device type or a different storage device type.

In some embodiments, a respective data storage device 140 may include a single medium device, while in other embodiments the respective data storage device 140 includes a plurality of media devices. In some embodiments, media devices include NAND-type flash memory or NOR-type flash memory. In some embodiments, storage device 140 may include one or more hard disk drives. In some embodiments, storage devices 140 may include a flash memory device, which in turn includes one or more flash memory die, one or more flash memory packages, one or more flash memory channels or the like. However, in some embodiments, one or more of the data storage devices 140 may have other types of non-volatile data storage media (e.g., phase-change random access memory (PCRAM), resistive random access memory (ReRAM), spin-transfer torque random access memory (STT-RAM), magneto-resistive random access memory (MRAM), etc.).

In some embodiments, each storage device 140 includes a device controller 144, which includes one or more processing units (also sometimes called CPUs or processors or microprocessors or microcontrollers) configured to execute instructions in one or more programs. In some embodiments, the one or more processors are shared by one or more components within, and in some cases, beyond the function of the device controllers. Media devices 146 are coupled to device controllers 144 through connections that typically convey commands in addition to data, and optionally convey metadata, error correction information and/or other information in addition to data values to be stored in media devices and data values read from media devices 146. Media devices 146 may include any number (i.e., one or more) of memory devices including, without limitation, non-volatile semiconductor memory devices, such as flash memory device(s). In some embodiments, media devices 146 may include NAND or NOR flash memory devices comprised of single level cells (SLC), multiple level cell (MLC), triple-level cells, or more.

In some embodiments, media devices 146 in storage devices 140 are divided into a number of addressable and individually selectable blocks, sometimes called erase blocks. In some embodiments, individually selectable blocks are the minimum size erasable units in a flash memory device. In other words, each block contains the minimum number of memory cells that can be erased simultaneously (i.e., in a single erase operation). Each block is usually further divided into a plurality of pages and/or word lines, where each page or word line is typically an instance of the smallest individually accessible (readable)

portion in a block. In some embodiments (e.g., using some types of flash memory), the smallest individually accessible unit of a data set, however, is a sector or codeword, which is a subunit of a page. That is, a block includes a plurality of pages, each page contains a plurality of sectors or codewords, and each sector or codeword is the minimum unit of data for reading data from the flash memory device.

A data unit may describe any size allocation of data, such as host block, data object, sector, page, multi-plane page, erase/programming block, media device/package, etc. Storage locations may include physical and/or logical locations on storage devices 140 and may be described and/or allocated at different levels of granularity depending on the storage medium, storage device/system configuration, and/or context. For example, storage locations may be allocated at a host logical block address (LBA) data unit size and addressability for host read/write purposes but managed as pages with storage device addressing managed in the media flash translation layer (FTL) in other contexts. Media segments may include physical storage locations on storage devices 140, which may also correspond to one or more logical storage locations. In some embodiments, media segments may include a continuous series of physical storage location, such as adjacent data units on a storage medium, and, for flash memory devices, may correspond to one or more media erase or programming blocks. A logical data group may include a plurality of logical data units that may be grouped on a logical basis, regardless of storage location, such as data objects, video media files, or other logical data constructs composed of multiple host blocks. In some embodiments, storage device 140 may be configured specifically for managing the storage and overwriting of video data in a continual monitoring application for video surveillance.

Storage interface 142 may include a physical interface for connecting to one or more external storage devices using an interface protocol that supports storage device access. For example, storage interface 142 may include a peripheral component interconnect express (PCIe), serial advanced technology attachment (SATA), small computer system interface (SCSI), serial attached SCSI (SAS), universal serial bus (USB), Firewire, or similar storage interface connector supporting storage protocol access to storage devices 140.n. In some embodiments, storage interface 142 may include a wireless data connection with sufficient bandwidth for video data transfer. Depending on the configuration and protocols used by storage interface 142, storage device 140.n may include a corresponding interface adapter, firmware, and/or protocols for receiving, managing, and responding to storage commands from network video recorder 130.

Network video recorder 130 may include a plurality of modules or subsystems that are stored and/or instantiated in memory 134 for execution by processor 132 as instructions or operations. For example, memory 134 may include a camera control subsystem 150 configured to control cameras 110. Memory 134 may include a video capture subsystem 152 configured to receive video streams from cameras 110. Memory 134 may include a video storage subsystem 154 configured to store received video data in storage device(s) 140 and/or network video storage 162. Memory 134 may include a video analysis subsystem configured to analyze video streams and/or video data for defined events, such as motion, recognized objects, recognized faces, and combinations thereof. Memory 134 may include a video display subsystem configured to selectively display video streams on user device 170, which may be attached to network video recorder 130 or remotely connected via network 102. In some embodiments, the functions of calibration system 164 may be integrated in network video recorder 130 and instantiated in memory 134 as a calibration subsystem and/or a subset of functions of analysis subsystem 156.

In some embodiments, camera control subsystem 150 may include interface protocols and a set of functions and parameters for using, configuring, communicating with, and providing command messages to cameras 110. For example, camera control subsystem 150 may include an API and command set for interacting with control circuit 122 to access one or more camera functions. In some embodiments, camera control subsystem 150 may be configured to set video configuration parameters for image sensor 112 and/or video encoder 118, access pan-tilt-zoom features of control circuit 122, set or modify camera-based motion detection, tripwire, and/or low light detection parameters in memory 116, and/or otherwise manage operation of cameras 110. For example, camera control subsystem 150 may maintain a video camera configuration table, pages, or similar data structures that includes entries for each video camera being managed and their respective camera-specific configuration parameters, active control features (such as PTZ control), and other configuration and control information for managing cameras 110. In some embodiments, each camera 110 may be assigned a unique camera identifier that may be used by camera control subsystem 150, video capture subsystem 152, and/or other subsystems to associate video data with the camera from which it was received.

In some embodiments, video capture subsystem 152 may include interface protocols and a set of functions and parameters for receiving video streams from cameras 110. For example, video capture subsystem 152 may include video data channels and related data buffers for managing a plurality of camera video data streams. In some embodiments, each video camera 110 may be allocated a dedicated video channel for continuously and/or selectively sending its video stream to network video recorder 130. Video capture subsystem 152 may be configured to pass each received video stream to video storage subsystem 154, video analysis subsystem 156, and/or video display subsystem 158.

In some embodiments, video storage subsystem 154 may include interface protocols and a set of functions and parameters for managing storage of video data in storage devices 140 and/or network video storage 162 for later retrieval and use by video analysis subsystem 156 and/or video display subsystem 158. For example, video storage subsystem 154 may write camera video stream data from video data buffers to non-volatile storage in storage devices 140 and video analysis subsystem 156 and/or video display subsystem 158 may be configured to selectively read video data from storage devices 140. In some embodiments, video storage subsystem 154 may include management of video storage space in storage devices 140 and/or network video storage 162 in accordance with one or more data retention and/or data archiving schemes. For example, surveillance system 100 may support continuous and/or triggered recording of video data from cameras 110 and video storage subsystem 154 may include logic for enforcing a data retention and overwriting policy whereby the fixed storage space of storage devices 140 is recycled for storing a recent period of captured video, video data meeting specific retention criteria, and/or deleting or archiving video data after one or more periods of time defined in the data retention policy. In some embodiments, video storage subsystem 154 may include or access video decoders and/or encoders for storing video data in a storage video format that is different than the camera video format, such as using a different codec, compression factor, frame rate, resolution, image size, etc.

In some embodiments, video analysis subsystem 156 may include interface protocols and a set of functions and parameters for analyzing video data from cameras 110. For example, video analysis subsystem 156 may be configured to run one or more event detection algorithms for determining, tagging, and/or initiating alerts or other actions in response to detected video events. In some embodiments, video analysis subsystem 156 may be configured to tag or build metadata structures that map detected events to time and image location markers for the video stream from which they are detected. For example, video analysis subsystem 156 may use motion, tripwire, object recognition, facial recognition, audio detection, speech recognition, and/or other algorithms to determine events occurring in a video stream and tag them in a corresponding metadata track and/or separate metadata table associated with the video data object. In some embodiments, video analysis subsystem 156 may include event handling logic for determining response to detection of one or more detected events or objects, such as raising an alert to user device 170 or triggering selective display of a video stream including the detected event through video display subsystem 158. In some embodiments, video analysis subsystem 156 may operate in real-time or near real-time on video data received by video capture subsystem 152, delayed processing of video data stored by video storage subsystem 154, and/or a combination thereof based on the nature (and processing requirements) of the video events, volume of video to be processed, and other factors. In some embodiments, video analysis subsystem 156 may comprise one or more analytics engines configured for a particular type of event and corresponding event detection algorithm or model.

In some embodiments, video display subsystem 158 may include interface protocols and a set of functions and parameters for displaying video from video capture subsystem 152 and/or video storage subsystem 154 on user device 170. For example, video display subsystem 158 may include a monitoring or display configuration for displaying one or more video streams in real-time or near real-time on a graphical user display of user device 170 and/or receive video navigation commands from user device 170 to selectively display stored video data from video storage subsystem 154. In some embodiments, video display subsystem 158 may maintain an index of real-time/near real-time video streams and/or stored or archived video streams that are available for access by user device 170. In some embodiments, the video index may include a corresponding metadata index that includes video data parameters (e.g., time, location, camera identifier, format, low light/normal light, etc.), detected video event metadata (event time, location, type, parameters, etc.), and/or video management parameters (expiration, active/archive, access control, etc.) for use in displaying and managing video data. Video display subsystem 158 may be configured to support user device 170 when directly attached to network video recorder 130 and/or via network 102 within a LAN, WAN, VPN, or the internet.

In some embodiments, surveillance system 100 may include one or more remote and/or cloud-based resources for supporting the functions of network video recorder 130 and/or user device 170. For example, surveillance system 100 may include a network video server 160 configured to host some, all, or select portions of the functions of network video recorder 130, such as a cloud-based server system or video surveillance as a service (VSaaS) server. As another example, surveillance system 100 may include network video storage 162 for storing active and/or archived video data, supplementing and/or replacing storage devices 140, such as a cloud-based network attached storage system or distributed storage system. In some embodiments, the majority of functions described above for network video recorder 130 may reside in network video recorder 130 and select functions may be configured to leverage additional resources in network video server 160 and/or network video storage 162. For example, network video server 160 may be configured to support specialized and/or processing intensive event detection algorithms to supplement video analysis subsystem 156 and/or network video storage 162 may be configured to support archiving of inactive video data for longer term storage.

In some embodiments, surveillance system 100 may include one or more calibration systems 164 for enabling calibration of post-processing parameters for output data from real-time or field object detectors, such as object detectors in analysis subsystem 124 of cameras 110 or analysis subsystem 156 of network video recorder 130. In some embodiments, calibration system 164 may be temporarily connected to surveillance system 100 during a calibration stage and disconnected during normal operation of surveillance system 100. For example, a separate computing device hosting a calibration controller may be connected to surveillance system 100 through network 100, network video recorder 130, and/or cameras 110. In some embodiments, calibration system 164 may be instantiated in network video recorder 130, network video server 160, and/or user device 170 to provide calibration support during a calibration stage or on a periodic basis. In some embodiments, calibration system 164 may include a processor, memory, input/output (I/O) devices, network interface, and/or other compute resources instantiating and/or supporting a calibration controller and/or functions described therein, as further described below. In some embodiments, calibration system 164 may incorporate compute resources, such as specialized processors and memory configurations, for supporting heavy weight object detection, motion, tracking, and/or classification models that could not practically be implemented by other system components, particularly cameras 110.

User device 170 may be any suitable computer device, such as a computer, a computer server, a laptop computer, a tablet device, a netbook, an internet kiosk, a personal digital assistant, a mobile phone, a smart phone, a gaming device, or any other computing device. User device 170 is sometimes called a host, client, or client system. In some embodiments, user device 170 may host or instantiate one or more applications for interfacing with surveillance system 100. For example, user device 170 may be a personal computer or mobile device running a surveillance monitoring and management application configured to provide a user interface for network video recorder 130. In some embodiments, user device 170 may be configured to access cameras 110 and/or their respective video streams through network video recorder 130 and/or directly through network 102. In some embodiments, one or more functions of network video recorder 130 may be instantiated in user device 170 and/or one or more functions of user device 170 may be instantiated in network video recorder 130.

User device 170 may include one or more processors 172 for executing compute operations or instructions stored in memory 174 for accessing video data and other functions of network video recorder 130 through network 102. In some embodiments, processor 172 may be associated with memory 174 and input/output device 176 for executing both video display operations and surveillance system management operations. Processor 172 may include any type of processor or microprocessor that interprets and executes instructions or operations. Memory 174 may include a random access memory (RAM) or another type of dynamic storage device that stores information and instructions for execution by processor 172 and/or a read only memory (ROM) or another type of static storage device that stores static information and instructions for use by processor 172 and/or any suitable storage element. In some embodiments, user device 170 may allocate a portion of memory 174 and/or another local storage device (in or attached to user device 170) for storing selected video data for user device 170. In some embodiments, user device 170 may include one or more input/output (I/O) devices 176. For example, a graphical display, such as a monitor and/or touch screen display, and/or other user interface components such as a keyboard, a mouse, function buttons, speakers, vibration motor, a track-pad, a pen, voice recognition, biometric mechanisms, and/or any number of supplemental devices to add functionality to user device 170. Network interface 178 may include one or more wired or wireless network connections to network 102. Network interface 178 may include a physical interface, such as an ethernet port, and/or related hardware and software protocols for communication over network 102, such as a network interface card, wireless network adapter, and/or cellular data interface.

User device 170 may include a plurality of modules or subsystems that are stored and/or instantiated in memory 174 for execution by processor 172 as instructions or operations. For example, memory 174 may include a video manager 180 configured to provide a user interface for selectively navigating and displaying real-time, near real-time, and/or stored video streams. Memory 174 may include alert manager 182 configured to provide a user interface for setting, monitoring, and displaying alerts based on video events. Memory 174 may include a camera manager 184 configured to provide a user interface for identifying, configuring, and managing cameras 110. Memory 174 may include a configuration manager 186 to provide a user interface for setting and managing system settings, user access controls, storage options, and other configuration settings for surveillance system 100. Memory 174 may include a network video recorder manager 188 configured to provide a user interface for identifying, configuring, and managing network video recorder 130 and/or multiple network video recorders. Memory 174 may include an analytics manager configured to provide a user interface for selecting, training, and managing event detection algorithms for surveillance system 100.

In some embodiments, video manager 180 may include interface protocols and a set of functions and parameters for navigating and displaying video streams from cameras 110. For example, video manager 180 may include a graphical user interface and interactive controls for displaying lists, tables, thumbnails, or similar interface elements for selecting and displaying video streams for particular cameras, times, locations, and/or events. In some embodiments, video manager 180 may enable split screen display of multiple camera video streams. For example, the near real-time video streams (with a predetermined lag based on network lag, storage, and processing times) from all active cameras may be displayed on a monitoring interface or a set of video streams corresponding to a detected event may be displayed in an event review interface. In some embodiments, video manager 180 may include a data structure summarizing all video data stored in surveillance system 100 to enable the user to locate and view older surveillance video. For example, a video management log or database may include entries for stored video data indexed by related metadata, such as video data parameters (e.g., time, location, camera identifier, format, low light/normal light, etc.), detected video event metadata (event time, location, type, parameters, etc.), and/or video management parameters (expiration, active/archive, access control, etc.). In some embodiments, video manager 180 may be configured to interface with video display subsystem 158 and/or storage subsystem 154 for determining and retrieving selected video data.

In some embodiments, alert manager 182 may include interface protocols and a set of functions and parameters for setting, monitoring, and displaying alerts based on video events. For example, the user may define a set of trigger events that generate visual, audible, tactile, and/or notification-based (electronic mail, text message, automated call, etc.) alert to user device 170. In some embodiments, alert manager 182 may include a plurality of preset alert conditions with associated event parameters and allow a user to enable and disable alert types and/or change associated event parameters. In some embodiments, alert manager 182 may be configured to overlay graphical elements representing detected events or event indicators on video streams displayed through video manager 180. For example, detected motion, objects, or faces may be boxed or highlighted, tagged with relevant identifiers, or otherwise indicated in the video playback on user device 170. In some embodiments, alert manager 182 may be configured to interface with video analysis subsystem 156, video capture subsystem 152, and/or directly with cameras 110 for receiving event notifications or parameters.

In some embodiments, camera manager 184 may include interface protocols and a set of functions and parameters for identifying, configuring, and managing cameras 110. Configuration manager 186 may include interface protocols and a set of functions and parameters for setting and managing system settings, user access controls, storage options, and other configuration settings. Network video recorder (NVR) manager 188 may include interface protocols and a set of functions and parameters for identifying, configuring, and managing network video recorder 130. For example, each of camera manager 184, configuration manager 186, and/or NVR manager 188 may include a series of graphical user interfaces for displaying their respective component identifiers and related configuration parameters and enabling the user to view and/or change those parameters for managing surveillance system 100 and its component systems. In some embodiments, camera manager 184, configuration manager 186, and/or NVR manager 188 may provide changes parameters to the effected components, such as camera manager 184 sending camera configuration parameter changes to selected cameras 110, NVR manager 188 sending NVR configuration parameter changes to network video recorder 130, and/or configuration manager 186 sending system configuration parameter changes to all effected components.

In some embodiments, analytics manager 190 may include interface protocols and a set of functions and parameters for selecting, training, and managing event detection algorithms. For example, analytics manager 190 may include a library of event detection algorithms for different event types. In some embodiments, the event detection algorithms may include a set of parameters and/or model weights that are preconfigured based on training data sets processed independent of surveillance system 100. For example, analytics manager 190 may include object detection algorithms for common objects, situations, and camera configurations. In some embodiments, analytics manager 190 may include preconfigured training data sets and/or allow the user to define training data sets for determining or refining event detection algorithm parameters and/or model weights based on predefined base algorithms or models. In some embodiments, analytics manager 190 may interface with analysis subsystem 156 for using the event detection algorithms configured through analytics manager 190 to process video data received by network video recorder 130 and/or selecting, training, and managing those algorithms.

Figure 2:
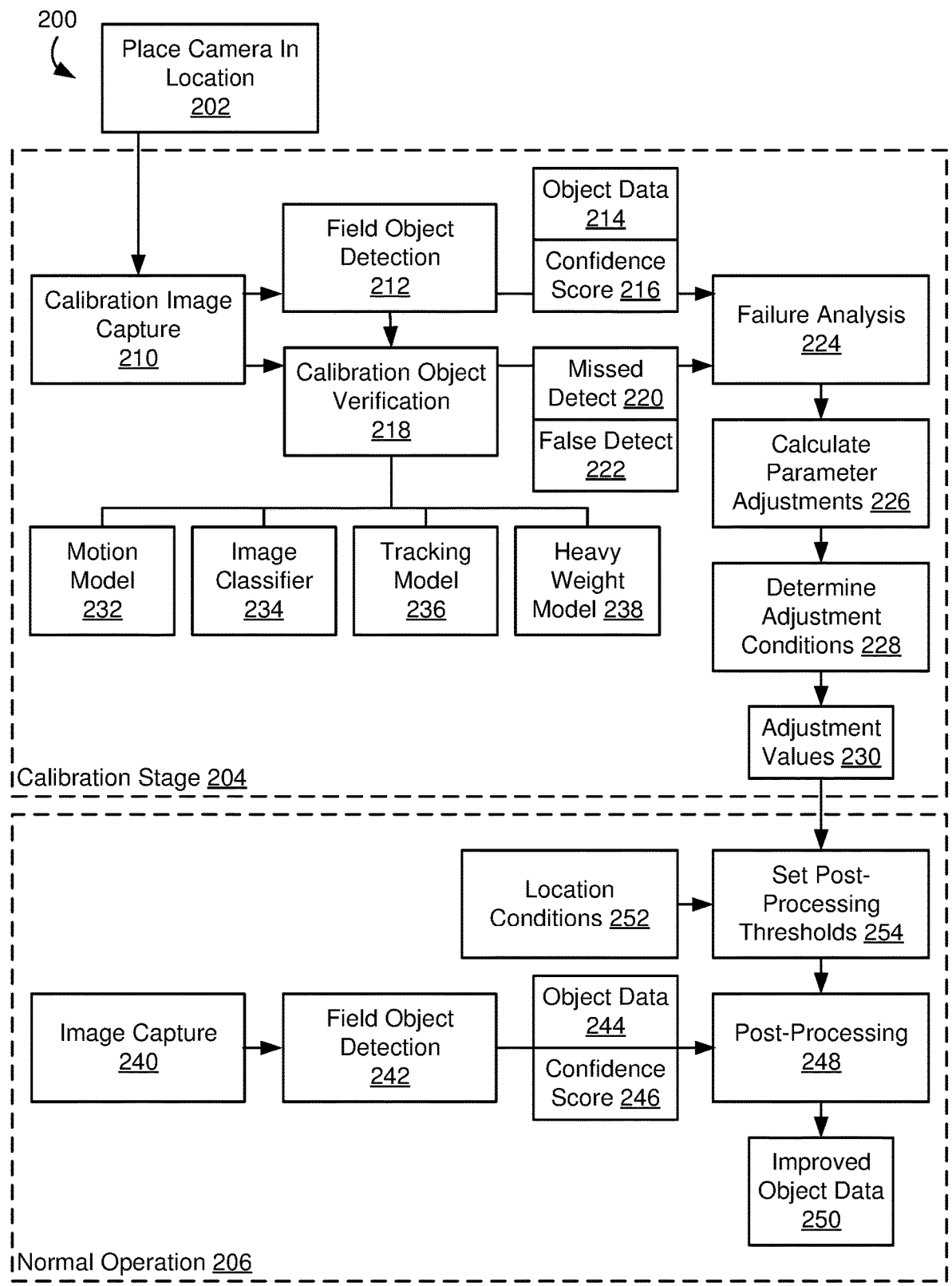
FIG. 2 schematically illustrates a calibration stage and normal operation for object detection that may be used by the computer-based surveillance system of FIG. 1.

FIG. 2 shows a schematic representation of calibration and object detection during normal operation that may be implemented in a computer-based surveillance system 200, such as surveillance system 100 in FIG. 1. At block 202, a video camera is placed in a location. For example, during the installation of surveillance system 200, each video camera may be physically mounted with a field of view that the user intends to monitor. In some embodiments, each video camera may be installed with a fixed position and field of view. In some embodiments, one or more cameras may include PTZ capabilities that allow them to change field of view from their mounted location.

In some embodiments, a calibration stage 204 may be initiated during or after camera installation. For example, a calibration system may be connected to surveillance system 200 and/or instantiated in one of the components thereof. In some embodiments, the timing and length of calibration stage 204 may be determined by a period of activity at the camera location and corresponding video data capture deemed sufficient for generating parameter adjustment values for the post-processing of output data from a field object detector, such as an object detector in the camera itself or and associated network video recorder.

In some embodiments, calibration stage 204 may be followed by normal operation 206, during which the calibration values determined during calibration stage 204 are applied to the real-time processing of video data captured by the video camera. For example, normal operation 206 may reflect the operating life of the video camera and/or periods of video capture during which no calibration is occurring. In some embodiments, calibration stage 204 may be completed only once for each video camera, such as during or immediately following installation. In some embodiments, calibration stage 204 may occur periodically over the operating life of surveillance system 200 and/or be re-executed in response to events, changes, or updates that may change the adjustment conditions and/or calibration values that should be used.

During calibration stage 204, calibration images may be captured at block 210. For example, the video camera may capture and encoded images from its video image sensor. At block 212, field object detection may be executed by the video camera (or a corresponding network video recorder) to determine object detection output data, such as object data 214 and confidence score 216. Independent of the field object detection at block 212, calibration object verification may be executed by a calibration system at block 218. For example, the video camera may send the video data and the output data from the field object detector to a calibration system connected to surveillance system 200 or instantiated in a network video recorder or VSaaS server. Calibration object verification may also generate object data (e.g., object class and position information) and/or confidence scores that may be of similar types to object data 214 and confidence score 216 to enable comparison and verification of the performance of the field object detector. In some embodiments, calibration object verification 218 may output missed object detection conditions 220 and false object detection conditions 222. For example, responsive to calibration object verification 218 determining that field object detection 212 did not return a data object when the object detector and/or image classifier of calibration object verification 218 did, a missed detection event may be identified and the output data values related to that missed detection may be passed to failure analysis 224. Responsive to calibration object verification 218 determining that field object detection 212 returned a data object when the object detector and/or image classifier of calibration object verification 218 didn't, a false detection event may be identified and the output data values related to that false detection may be passed to failure analysis 224. Calibration object verification at block 218 may be configured to provide substantially higher object detection accuracy than the field object detector.

Object detection may be executed at block 212 and block 218 for a selected video frame by both the field object detector and the calibration system. Object detection may include computational image processing that detects objects of desired types or classes within an image and provides position information, such as bounding boxes, and detected object classes for those objects. Object detection algorithms may include one-stage and two-stage methods, where one-stage methods, such as you-only-look-once (YOLO) models, single shot detector multibox (SSD Multibox), Retina-Net, etc. use a single pass through a deep neural network and two-stage methods, such as various region-based convolutional neural networks (R-CNN) models (Faster R-CNN, Mask R-CNN, Cascade R-CNN, etc.), use a selective search for regions of interest followed by processing each region (bounding box for the region of interest) through a neural network. Object detection may generate position information for one or more detected objects in the video frame. For example, for each object detected, the object detector may output location data, such as at least two corner coordinates, for bounding boxes that provide both a frame for the detected object image data and locate it within the larger video frame.

At block 224, failure analysis of the output data from field object detection at block 212 and calibration object verification 218 may be executed by the calibration system. For example, the calibration system may aggregate and process missed detection conditions 220, false detection conditions 222, and related object data 214 and confidence scores 216. In some embodiments, failure analysis 224 may execute statistical modeling of the missed detections and false detections to determine patterns in object data 214 and/or confidence score 216 that could be modified to reduce the likelihood of such outcomes. For example, cluster analysis may be applied to missed detections and/or false detections and correlate them with other conditions or parameters, such as object size, bounding box size, location in frame, time of day, light condition, weather, etc. In some embodiments, conditions may be received in metadata associated with the video data, such as timestamps, light condition tags, etc., and/or may be determined from the video data, metadata, and/or object data.

At block 226, parameter adjustments may be calculated. For example, based on failure analysis 224, performance of the field object detector may be improved by raising or lowering the object detection threshold and/or other threshold values associated with determining object detection events by a fixed or variable adjustment value. In some embodiments, parameter adjustments may be correlated to one or more adjustment conditions, such as time, lighting, location in frame, etc. Such adjustment conditions may be determined at block 228 and associated with their corresponding adjustment values. At block 230, adjustment values (with or without corresponding adjustment conditions) may be provided to the video camera (or network video recorder) for real-time use during normal operations 206.

In some embodiments, calibration object verification 218 may comprise one or more object detection and/or image classification algorithms and corresponding logic for comparing and evaluating the output data from those models to the output of the field object detector. For example, calibration object verification may use a plurality of object-related models and combine their results to generate more accurate determinations of object presence or absence in a video frame and/or more reliable position or object class information.

In some embodiments, calibration object verification 218 may include an object motion model 232. For example, a motion model may be configured to count the number of pixels which change from one frame to another. If the number of changed pixels exceeds a change threshold, the motion model may trigger a positive result. The motion model may return a bounding box for the object in motion. Note that the use of a motion model may be most appropriate where the object of interest is typically a moving object, such as cars or people passing through an entrance or exit. A motion model may be paired with a high precision classifier for the object of interest to finding missed detections and/or determine object class.

In some embodiments, calibration object verification 218 may include an image classifier 234, such as a high-precision image classifier. Image classifier 234 may process the frame as a whole to determine the presence or absence of an object of interest (a binary result) and may generally perform with higher reliability than object detectors. For example, a high precision image classifier may have an accuracy of 99% or higher with a very low false alarm rate. In some embodiments, image classifier 234 may operate alone or in conjunction with the other algorithms for determining false alarms and object class information.

In some embodiments, calibration object verification 218 may include a tracking model 236. For example, a tracking model may provide position and object class information for continuous frames in the video data. Tracking model 236 may operate in conjunction with and be initiated by an object detector, such as heavy weight model 238 described below. In some embodiments, tracking model 236 may be configured to run a fixed number of successive frames after initialization, such as 30 frames, before being re-initialized. In some embodiments, the bounding box and object class generated by tracking model 236 may be compared to the bounding box and object class generated by the field object detector for verifying object detections. Tracking model 236 may be paired with image classifier 234 for verifying missed detections.

In some embodiments, calibration object verification 218 may include a heavy weight object detection model 238. For example, heavy weight object detection model 238 may be similar in principle to the field object detector and generate similar output value types, but the heavy weight model may be a more accurate and more processing intensive object detector. Heavy weight object detection model 238 may be configured to have a higher accuracy value than the field object detector for the object of interest. In some embodiments, higher accuracy may be achieved through floating point versus integer-based object detector models and/or neural networks with a greater number of layers and/or nodes. In some embodiments, heavy weight object detection model 238 may be executed remotely, such as in a cloud-based system that enables specialized processing and memory resources.

In some embodiments, during calibration stage 204, video data and object data from the field object detector may only be selectively provided to the calibration system to reduce data transfer and calibration processing demands. For example, when using cloud-based resources, the video camera may not be configured to stream video data and field object detector data continuously, but to instead have it selectively triggered by confidence scores and/or periodic sampling, such as a periodic snapshots of the video data and corresponding field object detector data. In some embodiments, calibration object verification 218 may be responsive to confidence score 216 dropping below a verification threshold. For example, the confidence value for confidence score 216 may be a value from 0 to 1, with 1 representing certainty of the object detection, and the verification threshold may be a decimal value under which the detected object should be verified. If the verification threshold is met (e.g., the confidence value is less than the threshold value), then the video frame or object image data may be forwarded to calibration object verification 218.

During normal operation 206, surveillance images may be captured at block 240. For example, the video camera may capture and encoded images from its video image sensor. At block 242, field object detection may be executed by the video camera (or a corresponding network video recorder) to determine object detection output data, such as object data 214 and confidence score 216. Output data from field object detection 242 may be passed to post-processing 248. For example, post-processing may include evaluating object data 244 and/or confidence score 246 against one or more event detection thresholds. Responsive to calibration stage 204, surveillance system 200 may apply adjustment values 230 to object detection parameters, such as confidence score thresholds, bounding box sizes, intersection-over-union (IoU) values, and/or motion model sensitivity thresholds, for improved object data 250 and/or object detection events based thereon. In some embodiments, selection and application of calibration values may be dependent on location conditions 252, such as time, lighting, location in frame, etc. Surveillance system 200 may monitor or otherwise determine location conditions from the video data and/or metadata and use the conditions to determine adjustment conditions for indexing adjustment values. Selected adjustment values may be applied to default parameter values to set post-processing thresholds at block 254. By applying the calibrated adjustment values (or calibration values) during post-processing 254, improved object data 250 may generate calibrated object detection events that are more accurate than events detected by the field object detector without calibration. Note that post-processing 248 does not change the field object detection model itself and does not require modification of object detector model parameters and/or retraining of the model.

Figure 3:
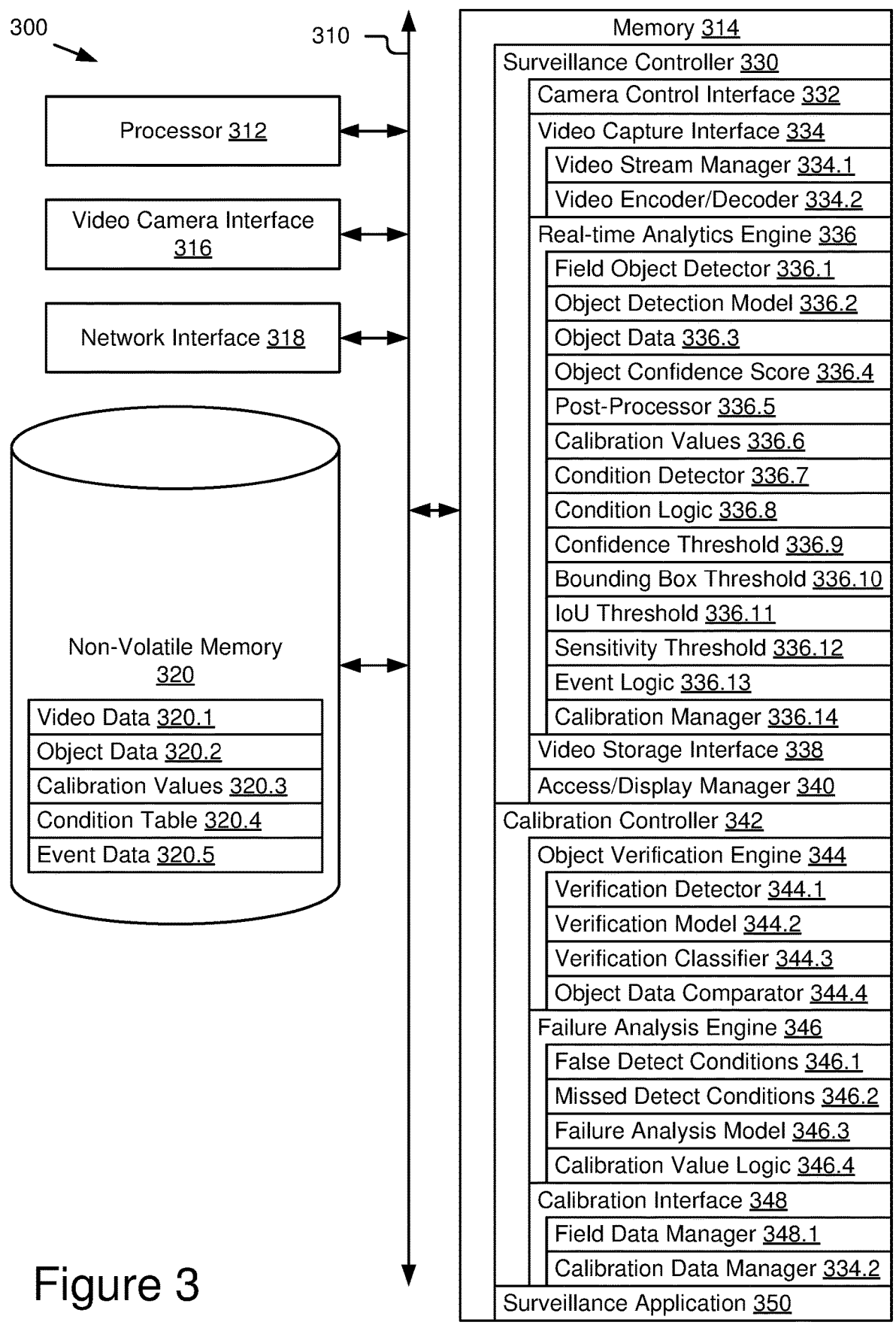
FIG. 3 schematically illustrates some elements of the computer-based surveillance system of FIG. 1.

FIG. 3 schematically shows selected modules of a surveillance system 300 configured for calibration of post-processing parameters to improve object detection accuracy for the field object detector. Surveillance system 300 may incorporate elements and configurations similar to those shown in FIGS. 1-2. For example, surveillance system 300 may be configured in a network video recorder similar to network video recorder 130. In some embodiments, one or more of the selected modules may access or be instantiated in the processors, memories, and other resources of video cameras configured for video capture, similar to video cameras 110, and/or user devices configured for video monitoring, similar to user device 170. For example, a video camera and its embedded or attached compute resources may be configured with some or all functions of video surveillance controller 330 to provide real-time video stream analysis in a distributed fashion at the edge of surveillance system 300 before selectively providing the video stream and generated metadata to other system components, such as a network video recorder or user device, for additional analytics and/or use in a surveillance application. In some embodiments, calibration controller 342 may be embodied in a network video recorder, VSaaS server, user device, and/or specialized calibration system.

Surveillance system 300 may include a bus 310 interconnecting at least one processor 312, at least one memory 314, and at least one interface, such as video camera interface 316 and network interface 318. Bus 310 may include one or more conductors that permit communication among the components of surveillance system 300. Processor 312 may include any type of processor or microprocessor that interprets and executes instructions or operations. Memory 314 may include a random access memory (RAM) or another type of dynamic storage device that stores information and instructions for execution by processor 312 and/or a read only memory (ROM) or another type of static storage device that stores static information and instructions for use by processor 312 and/or any suitable storage element such as a hard disk or a solid state storage element. In some embodiments, processor 312 and memory 314 may be compute resources available for execution of logic or software instructions stored in memory 314 and computation intensive tasks, such as real-time analytics engine 336, may be configured to monitor and share these resources.

Video camera interface 316 may be configured for connection with one or more video cameras. For example, video camera interface 316 may include a plurality of ethernet ports and supporting protocols compatible with PoE standards for connecting to a plurality of cameras. In some embodiments, video camera interface 316 may include a PoE network switch for providing power to connected cameras and routing data packets to and from connected cameras, such as control and video data. Video camera interface 316 may not be included in some systems, particularly where surveillance controller 330 is substantially embodied in "smart cameras" and network interface 318 provides substantially all communication with other system components.

Network interface 318 may include one or more wired or wireless network connections to network, similar to network 102. Network interface 318 may include a physical interface, such as an ethernet port, and related hardware and software protocols for communication over the network, such as a network interface card or wireless adapter.

Surveillance system 300 may include one or more non-volatile memory devices 320 configured to store video data. For example, non-volatile memory devices 320 may include a plurality of flash memory packages organized as an addressable memory array and/or one or more solid state drives or hard disk drives. In some embodiments, non-volatile memory devices 320 may include a plurality of storage devices within, attached to, or accessible by a network video recorder for storing and accessing video data.

Surveillance system 300 may include a plurality of modules or subsystems that are stored and/or instantiated in memory 314 for execution by processor 312 as instructions or operations. For example, memory 314 may include a surveillance controller 330 configured to control at least one video camera, capture and store video streams from that camera, provide real-time analytics, and enable user access, such as through surveillance application 350. Memory 314 may include a calibration controller configured to analyze video data to determine calibration values for use by surveillance controller 330 to improve the accuracy of real-time analytics engine 336. Memory 314 may include a surveillance application configured to provide a user interface for monitoring, reviewing, and managing surveillance video and/or surveillance system 300.

Surveillance controller 330 may include interface protocols, functions, parameters, and data structures for connecting to and controlling cameras, capturing and storing video data from those cameras, and interfacing with calibration controller 342 and surveillance application 350. For example, surveillance controller 330 may be an embedded firmware application and corresponding hardware in a network video recorder configured for network and/or direct communication with a set of associated video cameras. Surveillance controller 330 may be configured as a central collection point for video streams from the associated video cameras that enables analysis of captured video data by analytics engines and presentation of video streams and video event alerts to a user through surveillance application 350. In some embodiments, surveillance controller 330 may be an embedded firmware application and corresponding hardware in or directly associated with a video camera or video camera array. In some embodiments, the functions for surveillance controller 330 may be divided among one or more video cameras and a network video recorder, network video server, and/or user device.

In some embodiments, surveillance controller 330 may include a plurality of hardware and/or software modules configured to use processor 312 and memory 314 to handle or manage defined operations of surveillance controller 330. For example, surveillance controller 330 may include a camera control interface 332, a video capture interface 334, a real-time analytics engine 336, a video storage interface 338, and an access and display manager 340.

Camera control interface 332 may include camera interface protocols and a set of functions, parameters, and data structures for using, configuring, communicating with, and providing command messages to cameras through video camera interface 316 and/or network interface 318. For example, camera control interface 332 may include an API and command set for interacting with control circuit in each camera to access one or more camera functions. In some embodiments, camera control interface 332 may be configured to set video configuration parameters for camera image sensors, microphones, and/or video encoders, access pan-tilt-zoom features, set or modify camera-based motion detection, tripwire, object detection, and/or low light detection parameters, and/or otherwise manage operation of cameras. For example, camera control interface 332 may maintain a video camera configuration table, pages, or similar data structures that includes entries for each video camera being managed and their respective camera-specific configuration parameters, active control features (such as PTZ control), and other configuration and control information for managing the cameras. In some embodiments, each camera may be assigned a unique camera identifier that may be used by surveillance controller 330, calibration controller 342, and/or surveillance application 350 to associate video data with the camera from which it was received. In some embodiments, camera control interface 332 may include one or more control features within a video camera to allow surveillance controller 330 to access camera control systems, such as PTZ motor controls, lens focus, filters, and other camera subsystems.

Video capture interface 334 may include camera interface protocols and a set of functions, parameters, and data structures for receiving video streams from associated cameras and/or video image sensors. For example, video capture interface 334 may include video data channels and related data buffers for managing a plurality of camera video data streams. In some embodiments, each video camera may be allocated a dedicated video channel for continuously and/or selectively sending its video stream to video capture interface 334. For example, received video streams may be buffered by video capture interface 334 before being streamed to real-time analytics engine 336, video storage interface 338, and access/display manager 340. In some embodiments, video capture interface 334 may be configured to selectively stream video data to calibration controller 342 during a calibration stage. In some embodiments, video capture interface 334 may receive or generate camera video metadata describing the camera video format, time and location information, and event or condition tags based on on-board camera analytics.

In some embodiments, video capture interface 334 may include a video stream manager 336.1 configured to identify and manage the plurality of video streams being received from the cameras or video image sensors within a camera. For example, video stream manager 336.1 may manage video buffer allocation and space, processing of video streams from a camera video format or raw video format to another video format, directing buffered video frames through real-time analytics engine 336, and flushing of buffered video to storage through video storage interface 338 and/or for display via access/display manager 340. In some embodiments, video stream manager 336.1 may selectively send video streams to calibration controller 342 for calibration analysis and/or provide a notification to calibration controller 342 of the availability and storage location of video data for analysis in non-volatile memory 320 (as determined by video storage interface 338). In some embodiments, video stream manager 334.1 may include configurable video paths. For example, the real-time analytics path (through real-time analytics engine 336), the storage path (through video storage interface 338), the display path (through access/display manager 340), and/or the calibration path (through calibration controller 342) may each be configured for specific processing, priority, and timing, including selective allocation of compute resources to support each video path.

In some embodiments, video stream manager 334.1 may be configured to use encoder/decoder 334.2 to encode video data, such as raw video data, in a desired video format. For example, encoder/decoder 334.2 may receive raw video frames in accordance with a defined frame rate and resolution to generate a time-dependent video stream that may be further processed according to a selected video codec and corresponding compression scheme. In some embodiments, encoder/decoder 334.2 may be used to decode camera video streams in a first (camera) video format and re-encode them in one or more other formats. For example, video stream manager 334.1 may use encoder/decoder 334.2 to change the resolution, image size, frame rate, codec, compression factor, color/gray-scale, or other video format parameters.

Real-time analytics engine 336 may include one or more video analytics models and a set of functions, parameters, and data structures for processing video streams from associated cameras and/or video image sensors to enable real-time or near-real-time response to objects in the video stream. In some embodiments, real-time analytics engine 336 may include at least one object detector 336.1 (referred to as field object detector 336.1 to distinguish of object detection models used by calibration controller 342) configured to determine the presence in a video frame of an object type or class of interest. Real-time analytics engine 336 may be configured to receive and incorporate calibration values 336.6 into post-processing of object detector output data and corresponding event detection thresholds to improve object detection accuracy without increasing the complexity or processing requirements of field object detector 336.1.

In some embodiments, field object detector 336.1 may be configured for one or more object types, sometimes referred to as an object class, such as people, faces, cars, license plates, etc. Object detector 336.1 may include an object detection model 336.2, such as a neural network algorithm, trained with data sets targeting the object types of interest. In some embodiments, real-time analytics engine 336 may be configured for a plurality of object types and include object detectors trained to each object type. Object detector 336.1 may be configured to return data detection output data including object data 336.3 and an object confidence score 336.4. For example, object data 336.3 may include position information, such as bounding box coordinates, and object type or class. In some embodiments, object confidence score 336.4 may include a confidence value between 0 and 1 (0-100%), where 0 is no confidence and would not return object data and 1 is absolute certainty, with decimal values between 0 and 1 representing statistical confidence based on the application of object detection model 336.2 to the captured video data. In some embodiments, object data 336.3 may be stored in an object data structure 320.2 in non-volatile memory 320, such as an object data table or metadata tags associated with video data 320.1.

In some embodiments, post-processor 336.5 may receive object data 336.3 and object confidence score 336.4 from object detector 336.1 in order to process those values and related threshold parameters for evaluating event logic 336.13. For example, each time object detector 336.1 detects a data object with a non-zero object confidence score 336.4, post-processor may receive the output data for the detected data object for post-processing. In some embodiments, post-processor 336.5 may be configured in the analytics data path between object detector 336.2 and event logic 336.13. Event logic 336.13 may include a plurality of event conditions based on detected data objects and whether other systems or subsystems should be notified of the object detection event. These event conditions may include logical evaluation of one or more parameters from the output data, generally comparing output data parameters to corresponding event threshold parameters for determining an event. Post-processor 336.5 may enable the application of one or more calibration values 336.6 to the output data and threshold parameters. In some embodiments, calibration values 336.6 may be received from calibration controller 342, such as through calibration manager 336.14, and stored in calibration value data structure 320.3 in non-volatile memory 320.

In some embodiments, post-processor 336.5 may be configured to apply a plurality of calibration values 336.6 based on a variety of adjustment conditions. For example, calibration controller 342 may determine a number of calibration values applicable to different situations that occur in the video data based on the physical location and likely activities within the field of view of a particular camera. For example, different calibration values may be appropriate at night or during the day, during working hours or when a facility is closed, when it is raining or when it is sunny, etc. In some embodiments, a variety of calibration values may be mapped to corresponding adjustment conditions in a condition table 320.4 stored in non-volatile memory 320. For example, a matrix of condition values for different condition types may correspond to one or more calibration values for one or more post-processing parameter adjustments. In some embodiments, condition types may be selected from relative object size of the object type, location in video frame, time, light condition, weather condition, state of motion, etc. For example, camera location may determine an expected size (as a percentage of frame) for an object type, locations where objects are more or less likely (or possible), times of activity, and the impact of light, weather, and motion on object detection model 336.2. In some embodiments, real-time analytics engine 336 may include a condition detector 336.7 configured to determine one or more adjustment conditions from the video data, metadata, or other data available to the system. For example, condition detector 336.7 may evaluate video timestamps and tags or metadata related to lighting, weather, motion, or other adjustment conditions. In some embodiments, post-processor 336.5 may include condition logic 336.8 configured to determine adjustment conditions from condition detector 336.7 and use the condition values to determine appropriate calibration values 336.6. For example, condition logic 336.8 may use condition values for the adjustment conditions to index condition table 320.4 and determine the corresponding calibration values (and target parameters).

In some embodiments, post-processor 336.5 may be configured to adjust one or more object detection parameters before event logic 336.13 is evaluated. For example, post-processor 336.5 may store and apply calibration values for adjusting confidence threshold 336.9, bounding box threshold 336.10, IoU threshold 336.11, and/or sensitivity threshold 336.12. Confidence threshold 336.9 may be configured to evaluate whether object confidence score 336.4 meets a threshold for triggering an object detection event. Adaptive confidence thresholds may be calibrated to apply different confidence thresholds for different cameras, regions in the video frame, working times, and other adjustment conditions. Bounding box threshold 336.10 may be configured to evaluate whether one or more dimensions of a bounding box in object data 336.3 meets a bounding box size for triggering an object detection event. Adaptive bounding box thresholds may apply different bounding box size thresholds for different cameras, regions of the video frame, and other adjustment conditions to compensate for distance and perspective. IoU threshold 336.11 may be configured to evaluate whether an IoU value (corresponding to the overlap between two bounding boxes) in object data 336.3 meets a threshold for previous-to-current bounding box overlap as a function of location in the video frame. Adaptive IoU over tracking may enable different thresholds for different sizes of objects, regions of the video frame, and other adjustment conditions. Sensitivity threshold 336.12 may be configured to evaluate whether motion values associated with object data 336.2 (and/or the corresponding video frame) meet a motion threshold, such as number of pixels changes. Adaptive motion model sensitivity may enable different thresholds for different object types, regions of the video frame, lighting conditions, and other adjustment conditions. Post-processor 336.5 may apply calibration values to any of these threshold parameters.

In some embodiments, event logic 336.13 may include logical rules configured to trigger video camera control, video storage, analytics, and/or user notification responses to real-time analytics. For example, event logic 336.12 may be embodied in a rules engine that receives and/or maintains state information for triggers and outputs of camera control interface 332, video capture interface 334, real-time analytics engine 336, video storage interface 338, and/or access/display manager 340 to determine system responses to generated video streams and related conditions and analysis. In some embodiments, event logic 336.12 may be configured to generate alerts and/or notifications in response to a set of predefined event conditions. For example, when an object of a particular object type is detected in the video stream, an object detection notification or alert may be generated and sent to a user through access/display manager 340 and/or surveillance application 350. Similarly, in an object tracking context, an object exit event may trigger an object exit notification to the user. In some embodiments, event logic 336.12 may determine events that are used as triggers for operations by other systems. For example, an object detected event may determine a change in how raw video data is processed by video capture interface (such as increasing resolution of the resulting encoded video data), how the video cameras are positioned by camera control interface 332 (such as using PTZ control to change the field of view), where the resulting video is stored by video storage interface 338, and/or how access privileges are assigned for use by access/display manager 340. In some embodiments, event logic 336.12 may generate an event notification and send it over a network to surveillance application 350 to automatically execute one or more user-defined display, alert, system control, deep analytics, and/or metadata operations. In some embodiments, a calibrated event and calibrated event notification may be distinguished from other events and notifications in that the triggering criteria were modified by post-processor 336.5 applying calibration values to one or more parameters in the event criteria and the resulting events and notifications are more accurate than without post-processor 336.5

In some embodiments, calibration manager 336.14 may include or access a subsystem for interfacing with calibration controller 342. For example, calibration manger 336.14 may determine the calibration period, send video data and object data to calibration controller 342, and receive calibration values and/or adjustment conditions from calibration controller 342. In some embodiments, calibration manager 336.14 may include logic for selectively sending video data and/or output data from field object detector 336.1 to calibration controller 342. For example, calibration manager 336.14 may include logic for monitoring timers, confidence scores, and/or other parameters for determining whether and when data is shared with calibration controller 342.

Video storage interface 338 may include storage interface protocols and a set of functions, parameters, and data structures for managing storage of video data in non-volatile memory 320, such as storage devices and/or network video storage, for later retrieval and use by access/display manager 340 and/or calibration controller 342. For example, video storage interface 338 may write camera video stream data from video data buffers and/or storage path video data from video capture interface 334 to non-volatile memory 320 as video data 320.1. In some embodiments, video storage interface 338 may include a storage manager configured to manage video storage space in non-volatile memory 320 in accordance with one or more data retention and/or data archiving schemes. For example, surveillance system 300 may support continuous and/or triggered recording of video data from associated cameras and the storage manager may include logic for enforcing a data retention and overwriting policy whereby the fixed storage space of non-volatile memory 320 is recycled for storing a recent period of captured video, video data meeting specific retention criteria, and/or deleting or archiving video data after one or more periods of time defined in the data retention policy. Video storage interface 338 may also include a metadata manager to receive and store video metadata as tags or metadata tracks in the video data or in an associated metadata table, file, or similar data structure associated with the corresponding video data objects. In some embodiments, the metadata manager may be configured to include object data 320.2, calibration values 320.3, condition table 320.4, and/or event data 320.5. For example, object data 320.2 may include bounding box coordinates and object type tags for each object detected within a video stream and event data 320.5 may include timestamps and event types for event occurrences in the video stream.

Access/display manager 340 may include APIs and a set of functions, parameters, and data structures for displaying video from video capture interface 334 and/or video storage interface 338 to a user display application, such as surveillance application 350. For example, access/display manager 340 may include a monitoring or display configuration for displaying one or more video streams in real-time or near real-time on a graphical user display of a user device and/or receive video navigation commands from the user device to selectively display stored video data from non-volatile memory 320. In some embodiments, access/display manager 340 may maintain an index of real-time/near real-time video streams and/or stored or archived video streams that are available for access by surveillance application 350. In some embodiments, the video index may include a corresponding metadata index that includes video data parameters (e.g., time, location, camera identifier, format, low light/normal light, etc.), detected video event metadata (event time, location, type, parameters, etc.), and/or video management parameters (expiration, active/archive, access control, etc.) for use in displaying and managing video data. Access/display manager 340 may be configured to support surveillance application 350 when instantiated in the same computing device as surveillance controller 330, directly attached to the computing device hosting surveillance controller 330, and/or via a network within a LAN, WAN, VPN, or the internet. In some embodiments, access/display manager 340 may provide selective access to user video streams allocated by video capture interface 334 to the user video path.

Calibration controller 342 may include interface protocols, functions, parameters, and data structures for analyzing video data and output data from field object detector 336.1 to determine calibration values and corresponding adjustment conditions. For example, calibration controller 342 may be an embedded firmware application and corresponding hardware in a network video recorder, VSaaS server, or separate calibration system in communication with surveillance controller 330. In some embodiments, calibration controller 342 may run on a separate computing device from surveillance controller 330. In some embodiments, calibration controller 342 may be active during a calibration stage until calibration values are provided to real-time analytics engine 336 and may then be disconnected, uninstalled, or otherwise removed from surveillance system 300. In some embodiments, calibration controller 342 may include a plurality of hardware and/or software modules configured to use processor 312 and memory 314 to handle or manage defined operations of calibration controller 342. For example, calibration controller 342 may include an object verification engine 344, a failure analysis engine 346, and a calibration interface 348.

Object verification engine 344 may include a set of functions, parameters, and data structures for processing target video streams for predefined object types, determining object data with superior accuracy to field object detector 336.1, and comparing the object data to verify the accuracy of field object detector 336.1. For example, object verification engine 344 may be configured to process video data 320.1 and object data 320.2 received from surveillance controller 330 though calibration interface 348. In some embodiments, object verification engine 344 may include an object verification detector 344.1 based on a verification model 344.2 and, in some configurations, supported by an image classifier 344.3. In some embodiments, verification detector 344.1 may be configured as a heavy weight object detector using a more accurate object detector model as verification model 344.2. For example, the heavy weight object detector may have a higher accuracy value than field object detector 336.1 based on the data type (floating point versus integer) and/or complexity of the neural networks used. In some embodiments, verification detector 344.1 may be based on a plurality of object detection models and may include motion detection and object tracking models to improve the accuracy of object detection. For example, verification detector 344.1 may employ a motion model, object tracking model, and/or object detection model in verification model 344.2 to verify objects detected by field object detector 336.1. The more accurate object data generated by verification detector 344.1 and verification model 344.2 may be compared to object data generated by field object detector 336.1 by object data comparator 344.4. For example, this may enable object data comparator 344.4 to determine whether the object data, such as bounding box and object class, match between the two sets of object data, and presume that the object data from verification detector 344.1 is correct. In some embodiments, comparison of the object data from verification detector 344.1 may enable object data comparator 344.4 to determine false detection events, where field object detector 336.1 detected an object but similar object type and/or position information was not verified by verification detector 344.1

In some embodiments, object verification engine 344 may include a verification image classifier 344.3 to enable further verification of object data from field object detector 336.1. Verification image classifier 344.3 may be configured to return a binary indicator for an object type (present or absent) and an object type confidence metric. For example, image classifier 344.3 may be configured for a human face object type and trained on a data set for human face detection. Image classifier 344.3 may process the dimensional features of the entire video frame to determine whether there are any occurrences of the object type. If one or more data objects of object type, such as human faces, are present in the video frame, image classifier 344.3 may return a binary indicator value of 1, indicating that the object is present. If no data objects of object type are detected in the video frame, image classifier 344.3 may return a binary indicator value of 0. While 1 and 0 are the most common binary indicators used, other flag or state values may be used. Object data comparator 344.4 may compare the object type from the object data of field object detector 336.1 to the object type output from image classifier 344.3 to further confirm false detection events and determine missed detection events. In some embodiments, verification image classifier 344.3 may process video data that did not include object detections by field object detector 336.1 to determine missed detection events.

Failure analysis engine 346 may include a set of functions, parameters, and data structures for conducting a failure analysis of aggregated false detection events and/or missed detection events to determine calibration values to be used by real-time analytics engine 336. For example, failure analysis engine 346 may aggregate false detection conditions 346.1 and missed detection conditions 346.2 and apply failure analysis model 346.3 to determine recurring failure modes, corresponding threshold parameters, and/or conditions. In some embodiments, failure analysis model 346.3 may be configured to apply statistical cluster analysis based on false detection conditions 346.1 and missed detection conditions 346.2 and correlating each to variations of one or more post-processing parameter thresholds. In some embodiments, multivariable clustering models and/or additional statistical models may enable failure analysis model 346.3 to find correlations with various condition types and values, such as relative object size of the object type, location in video frame, time, light condition, weather condition, state of motion, etc. In some embodiments, failure analysis engine 346 may include calibration value logic 346.4 configured to parse the output from failure analysis model 346.3 to determine post-processing parameter thresholds, calibration values that may be applied to improve their performance, and, in some configurations, adjustment conditions to selectively enable the calibration values. For example, calibration value logic 346.4 may include a logical matrix for processing parameter thresholds and adjustment conditions, and use variance calculations from failure analysis model 346.2 to determine calibration values and populate them at corresponding intersections of processing parameters and adjustment conditions. In some embodiments, calibration value logic 346.4 may return a set of calibration values for corresponding threshold parameters and/or a condition table mapping calibration values, threshold parameters, and adjustment conditions through calibration interface 348 to surveillance controller 330.

Calibration interface 348 may include an API and functions, parameters, and data structures for exchanging data between surveillance controller 330 and calibration controller 342. For example, calibration interface 348 may interact with calibration manager 336.14 in surveillance controller 330 to send and receive data over internal or network protocols and/or through storage to non-volatile memory 320. In some embodiments, calibration interface 348 may include a field data manager 348.1 configured to receive video data and output data from field object detector 336.1 for verification by object verification engine 344. For example, during the calibration stage, calibration manager 336.14 may continuously or selectively send video data and corresponding object data detected by field object detector 336.1 to field data manager 348.1 and field data manager 348.1 may access, buffer, and/or store the field data for use by object verification engine 344 and failure analysis engine 346. In some embodiments, calibration interface 348 may include a calibration data manager 334.2 configured to provide calibration values and related data to calibration manager 336.14 for use during normal operation. For example, upon completion of the calibration stage, calibration data manger 334.2 may return the calibration values and corresponding threshold parameters and/or adjustment conditions to calibration manager 336.14.

Surveillance application 350 may include interface protocols, functions, parameters, and data structures for providing a user interface for monitoring and reviewing surveillance video and/or managing surveillance system 300, such as through surveillance controller 330. For example, surveillance application 350 may be a software application running on a user device integral to, connected to, or in network communication with surveillance controller 330 and/or a hosting network video recorder. In some embodiments, surveillance application 350 may run on a separate computing device from surveillance controller 330, such as a personal computer, mobile device, or other user device. In some embodiments, surveillance application 350 may be configured to interact with APIs presented by access/display manager 340.

In some embodiments, surveillance application 350 may include a plurality of hardware and/or software modules configured to use processor 312 and memory 314 to handle or manage defined operations of surveillance application 350. For example, surveillance application 350 may include a video manager, an alert manager, and an analytics manager.

The video manager may include APIs and a set of functions, parameters, and data structures for navigating and displaying video streams from video cameras accessed through surveillance controller 330. For example, the video manager may include a graphical user interface and interactive controls for displaying lists, tables, thumbnails, or similar interface elements for selecting and displaying video streams for particular cameras, times, locations, and/or events. In some embodiments, the video manager may enable split screen display of multiple camera video streams. For example, the near real-time video streams (with a predetermined lag based on network lag, storage, and processing times) from all active cameras may be displayed on a monitoring interface or a set of video streams corresponding to a detected event may be displayed in an event review interface. In some embodiments, the video manager may include a data structure summarizing all video data stored in surveillance system 300 to enable the user to locate and view older surveillance video. For example, a video management log or database may include entries for stored video data indexed by related metadata, such as video data parameters (e.g., time, location, camera identifier, format, low light/normal light, etc.), detected video event metadata (event time, location, type, parameters, etc.), and/or video management parameters (expiration, active/archive, access control, etc.).

The alert manager may include APIs and a set of functions, parameters, and data structures for setting, monitoring, and displaying alerts based on detected video events. For example, the user may define a set of trigger events that generate visual, audible, tactile, and/or notification-based (electronic mail, text message, automated call, etc.) alerts to a user device. In some embodiments, the alert manager may include a plurality of preset alert conditions with associated event parameters and allow a user to enable and disable alert types and/or change associated event parameters. In some embodiments, the alert manager may be configured to operate in conjunction with event overlay function to overlay graphical elements representing detected events or event indicators on video streams displayed through the video manager. For example, detected motion, objects, or faces may be boxed or highlighted, tagged with relevant identifiers, or otherwise indicated in the video playback on the user device.

The analytics manager may include APIs and a set of functions, parameters, and data structures for selecting, training, and managing event detection algorithms. For example, the analytics manager may include a user interface to analytical model library for one or more analytics engines. In some embodiments, the event detection algorithms may include a set of parameters and/or model weights that are preconfigured based on training data sets processed independent of surveillance system 300. For example, the analytics manager may include object detection algorithms for common objects, situations, and camera configurations. In some embodiments, the analytics manager may include access to training services and/or preconfigured training data sets. For example, the analytics manager may enable the user to define training data sets for determining or refining event detection algorithm parameters and/or model weights based on predefined base algorithms or models. In some embodiments, the analytics manager may also enable user control of the calibration stage and operations of calibration controller 342. In some embodiments, the analytics manager may interface directly with real-time analytics engine 336 for selecting, training, managing, and using the event detection algorithms configured through the analytics manager. In some embodiments, the analytics manager may interface with access/display manager 340 for accessing and managing real-time analytics engine 336 and/or one or more analytics engines supporting deep analytics through the network video recorder, VSaaS server, etc.

Figure 4:
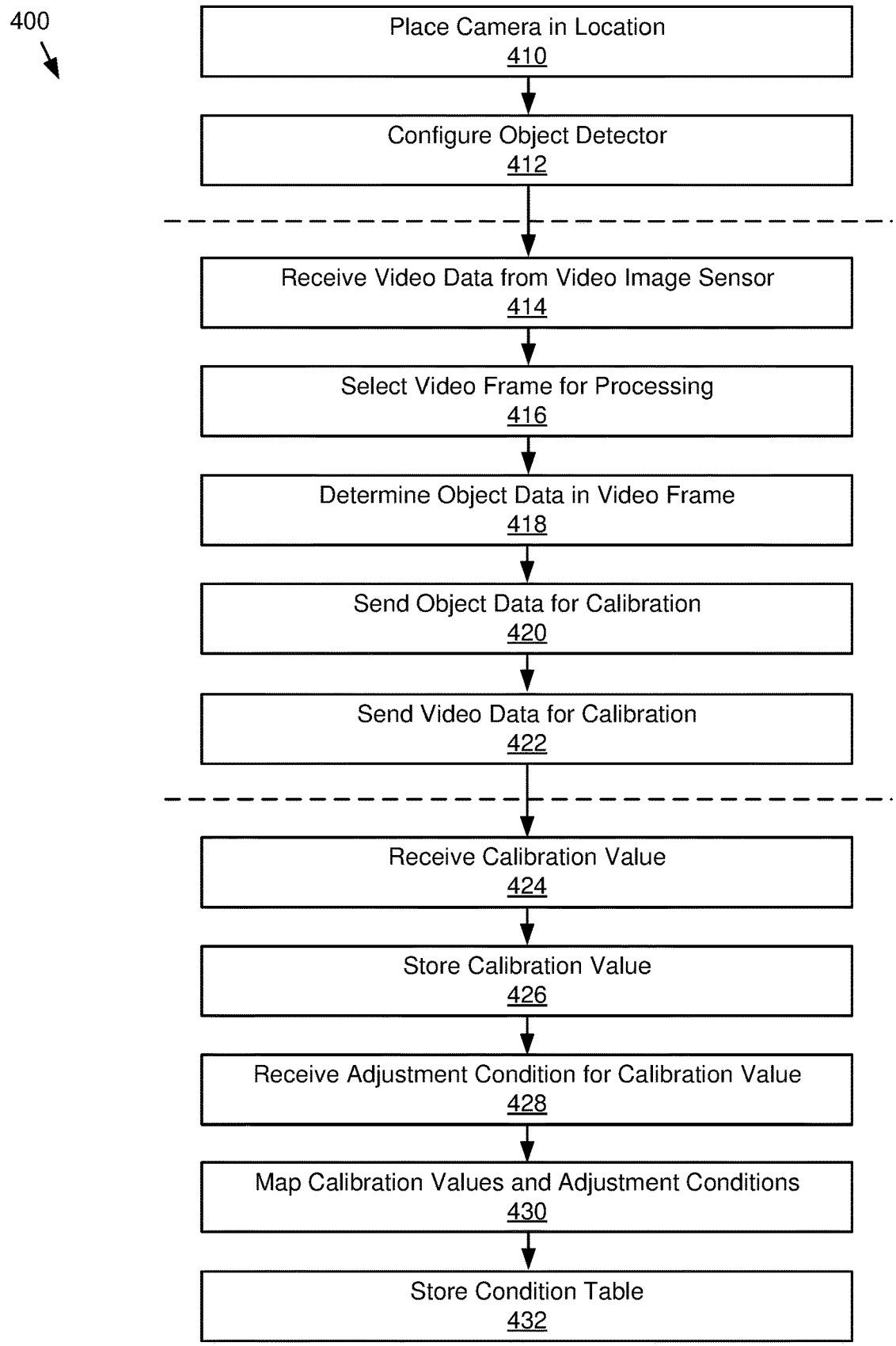
FIG. 4 is a flowchart of an example method of calibrating real-time object detection for a surveillance video camera.

As shown in FIG. 4, surveillance system 300 may be operated according to an example method of calibrating real-time object detection for a surveillance video camera, i.e., according to method 400 illustrated by blocks 410-432 in FIG. 4.

At block 410, a video camera may be placed in a location. For example, during installation, a video camera may be mounted in a physical location with a field of view for image capture.

At block 412, an object detector may be configured. For example, the video camera may include a real-time object detector running on camera or in an associated network video recorder and the object detector may configured with a specific object detection model and model parameters based on training data for an object type of interest.

At block 414, a calibration stage may begin and video data may be received from the video image sensor in the camera. For example, a surveillance controller may receive or generate encoded video data.

At block 416, a video frame may be selected for processing. For example, the real-time analytics engine may select video frames in real-time or near-real time for processing.

At block 418, object data may be determined in the video frame. For example, a field object detector may detect an object of interest in the video frame and return object data and a confidence score for the detected object.

At block 420, the object data may be sent to a calibration system for processing. For example, the object data and confidence score may be sent from the real-time analytics engine to a calibration controller.

At block 422, the video data may be sent to the calibration system for processing. For example, the video frame and/or adjacent video frames may be sent from the surveillance controller to the calibration controller. In some embodiments, block 414-422 may be repeated periodically or for each video frame during the calibration stage.

At block 424, at least one calibration value may be received. For example, the real-time analytics engine may receive a set of calibration values for post-processing output from the field object detector.

At block 426, the calibration data may be stored. For example, the real-time analytics engine may store the set of calibration values for use by the post-processor during normal operation.

At block 428, adjustment conditions may be received for the calibration values. For example, the real-time analytics engine may receive adjustment conditions corresponding to some or all of the set of calibration values.

At block 430, the calibration values and adjustment conditions may be mapped. For example, the real-time analytics engine may generate a condition table that uses adjustment condition values to index the calibration values that should be used for a particular post-processing threshold calculation.

At block 432, the calibration table may be stored. For example, the real-time analytics engine may store the calibration table in non-volatile memory for use by the post-processor during normal operation.

Figure 5:
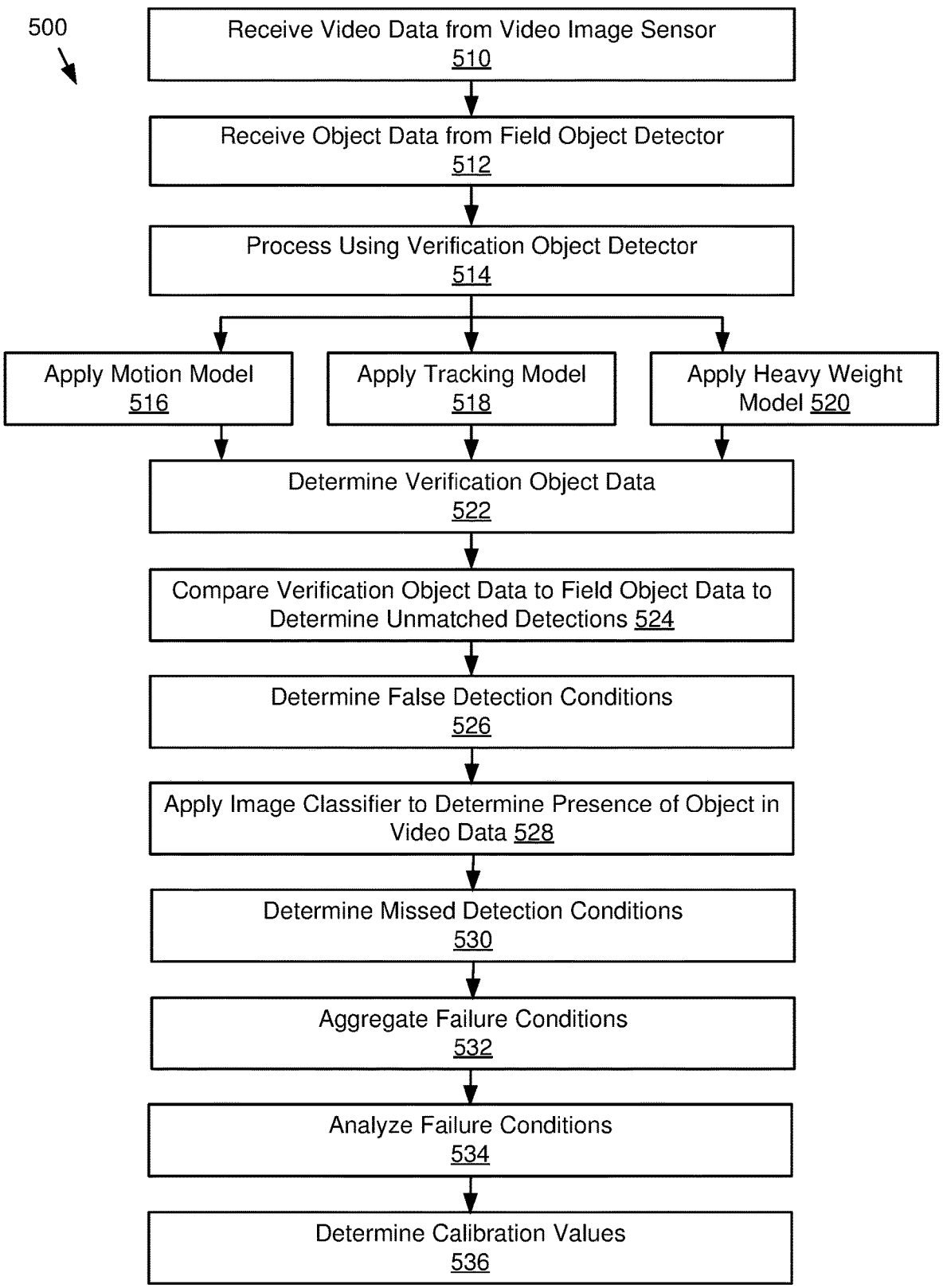
FIG. 5 is a flowchart of an example method of determining calibration values during a calibration stage.

As shown in FIG. 5, surveillance system 300 may be operated according to an example method for determining calibration values during a calibration stage, i.e., according to method 500 illustrated by blocks 510-536 in FIG. 5.

At block 510, video data may be received from a video image sensor. For example, a surveillance controller may capture and encode video data and send it to a calibration controller for processing.

At block 512, object data may be received from a field object detector. For example, the surveillance controller may send object data related to detected data objects from its field object detector to the calibration controller for processing.

At block 514, video data may be processed using a verification object detector. For example, the calibration controller may have a more accurate object detection model for verifying the performance of the field object detector.

At block 516, a motion model may be applied. For example, the calibration controller may apply a motion model for verifying a moving data object is present in the video data where the field object detector indicated.

At block 518, an object tracking model may be applied. For example, the calibration controller may apply an object tracking model, initiated by an object detector model, for verifying the detected data object is present in the video data where the field object detector indicated.

At block 520, a heavy weight object detection model may be applied. For example, the calibration controller may apply a different object detection model with a higher accuracy value than the field object detector to verifying the detected data object is present in the video data where the field object detector indicated.

At block 522, verification object data may be determined. For example, the verification object detector and verification models may return verification object data including position information, such as bounding box coordinates, and an object type.

At block 524, verification object data may be compared to field object data to determine unmatched detections. For example, the object verification engine may compare the object data from the verification object detector and the field object detector to determine where they disagree, such as unmatched bounding boxes between respective object data.

At block 526, false detection conditions may be determined. For example, the object verification engine may determine a false detection event each time the verification object detector does not find the object data the field object detector did.

At block 528, an image classifier may determine the presence of an object of interest in the video data. For example, the object verification engine may use a high-precision image classifier to process video data and determine objects of interest not detected by the field object detector.

At block 530, missed detection conditions may be determined. For example, the object verification engine may determine a missed detection event each time the verification image classifier detects and object type that was note detected by the field object detector.

At block 532, failure conditions may be aggregated. For example, false detection events, missed detection events, and corresponding condition parameters may be aggregated by a failure analysis engine.

At block 534, failure conditions may be analyzed. For example, the failure analysis engine may apply one or more statistical clustering models to determine clusters of object detection failures and corresponding parameter threshold variances and conditions.

At block 536, calibration values may be determined. For example, the failure analysis engine may determine calibration values that can be used during normal operation to post-process object data for better object detection results.

Figure 6:
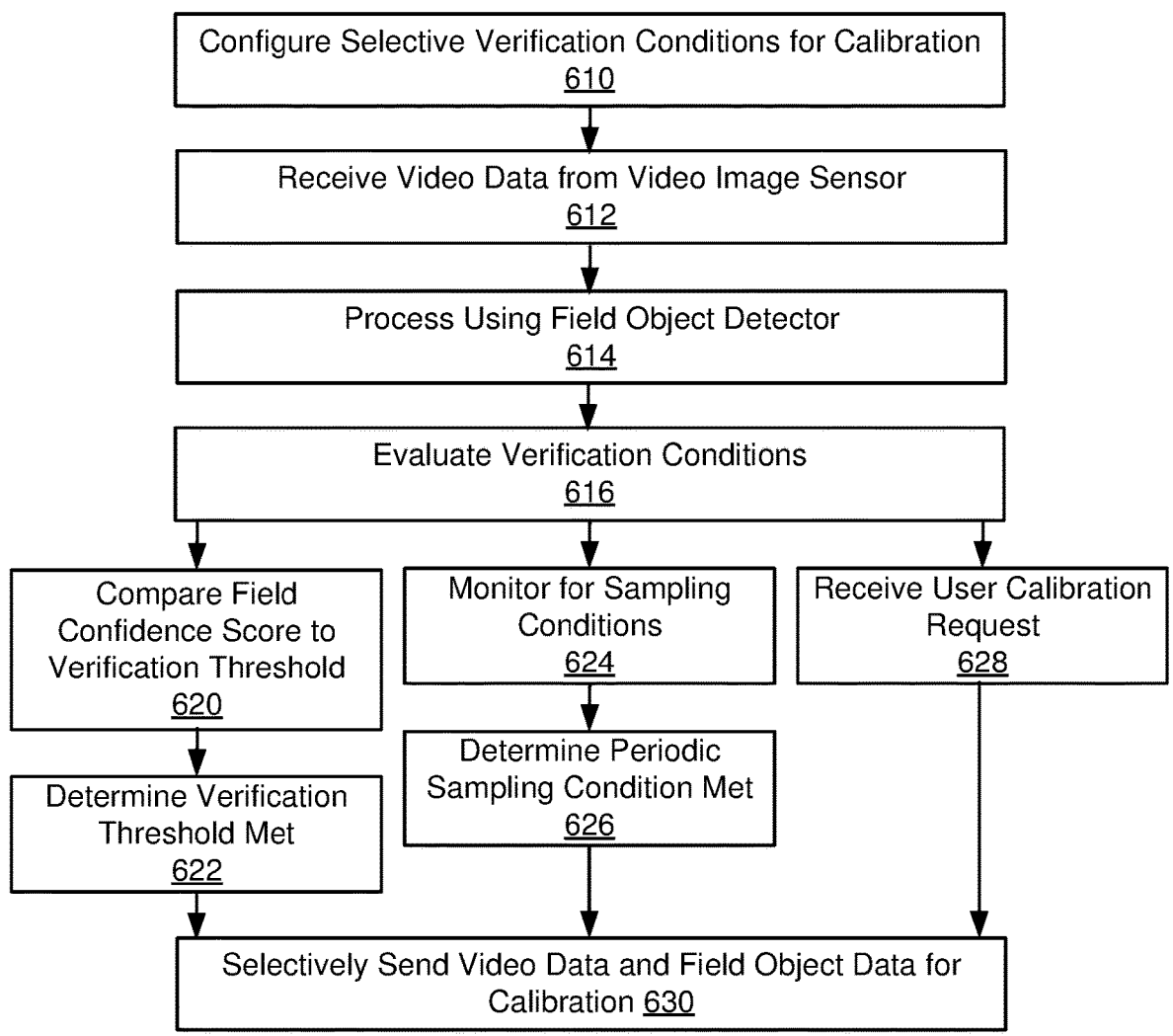
FIG. 6 is a flowchart of an example method of selectively processing video data and field object detector data for calibration.

As shown in FIG. 6, surveillance system 300 may be operated according to an example method for selectively processing video data and field object detector data for calibration, i.e., according to method 600 illustrated by blocks 610-630 in FIG. 6.

At block 610, selective verification conditions may be configured. For example, a calibration manager in a surveillance controller may be configured with a set of verification conditions to be evaluated before sending object data and video data to the calibration controller.

At block 612, video data may be received from the video image sensor. For example, the surveillance controller may capture and encode video data.

At block 614, video data may be processed using the field object detector. For example, the real-time analytics engine may use the field object detector to process video framed from the captured video data.

At block 616, verification conditions may be evaluated. For example, the calibration manager may evaluate the set of verification conditions against current parameters to determine whether the video data and object data should be sent for calibration processing.

At block 620, the confidence score for the field object detector may be compared to a verification threshold. For example, the calibration manager may compare the confidence score for a detected object to a verification threshold.

At block 622, the verification threshold may be determined to be met. For example, the confidence score may be below the threshold, indicating that the object detection may be questionable and should be verified for calibration purposes.

At block 624, sampling conditions may be monitored. For example, the set of verification conditions may include time and/or event-based sampling conditions for determining periods of video data and object data to send for calibration purposes.

At block 626, periodic sampling conditions may be met. For example, a period of time may have elapsed since that last video data and object data sample was sent to the calibration controller.

At block 628, a user calibration request may be received. For example, surveillance system 300 may be configured to receive user calibration requests through the surveillance application on the user device to trigger calibration. In some embodiments, the user may use calibration requests when known objects or location conditions are present to trigger calibration for those objects and conditions.

At block 630, video data and field object data may be selectively sent for calibration. For example, responsive to blocks 622, 626, and/or 628, the calibration manager may determine video frames or periods of video frames and corresponding object data, if there is any, to the calibration controller.

Figure 7:
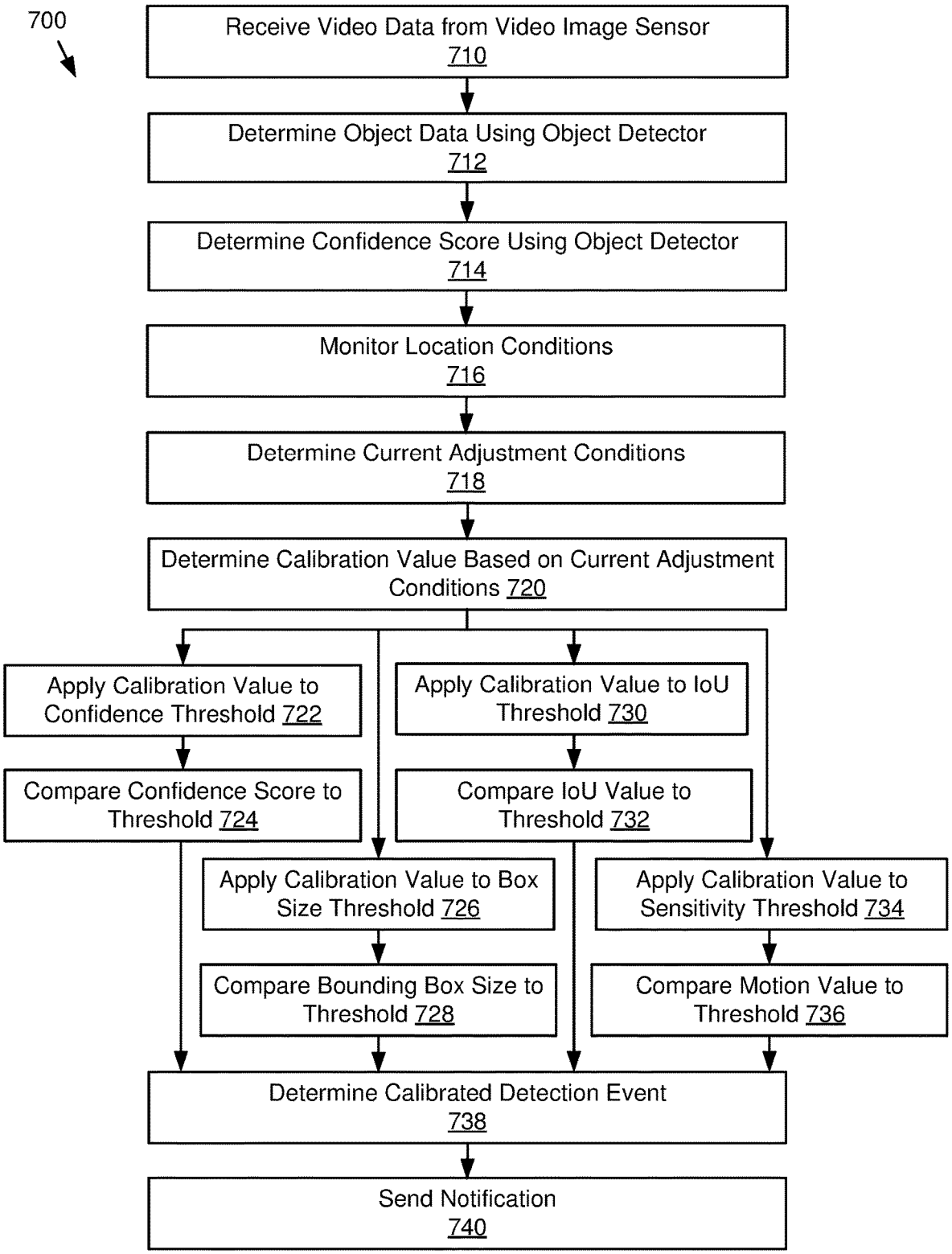
FIG. 7 is a flowchart of an example method of object detection during normal operation for a calibrated surveillance video camera.

As shown in FIG. 7, surveillance system 300 may be operated according to an example method for object detection during normal operation for a calibrated surveillance video camera, i.e., according to method 700 illustrated by blocks 710-740 in FIG. 7.

At block 710, video data may be received from the video image sensor. For example, the surveillance controller may capture and encode video data from the video image sensor of the video camera.

At block 712, object data may be determined using an object detector. For example, a real-time analytics engine may use a field object detector to determine object data for a detected object of interest.

At block 714, a confidence score may be determined using the object detector. For example, the field object detector may also return a confidence score with the object data.

At block 716, location conditions may be monitored. For example, the surveillance controller may monitor time, lighting, weather, and other location conditions that could impact object detector performance.

At block 718, current adjustment conditions may be determined. For example, a post-processor may collect adjustment condition types and values that correspond to conditions for applying calibration values.

At block 720, calibration values may be determined based on current adjustment conditions. For example, the post-processor may use the current adjustment conditions to index a condition table and determine relevant threshold parameters and calibration values for modifying those threshold parameters.

At block 722, the calibration value may be applied to a confidence threshold. For example, the post-processor may apply a calibration value for confidence threshold parameters to the confidence threshold.

At block 724, the confidence score for a detected object may be compared to the confidence threshold. For example, the post-processor may compare the confidence score from the field object detector to the calibrated confidence threshold as at least one factor in determining a calibrated detection event at block 738.

At block 726, the calibration value may be applied to a box size threshold. For example, the post-processor may apply a calibration value for bounding box size threshold parameters to the bounding box size threshold.

At block 728, the bounding box size for a detected object may be compared to the box size threshold. For example, the post-processor may compare the bounding box size from object data generated by the field object detector to the calibrated bounding box size threshold as at least one factor in determining a calibrated detection event at block 738.

At block 730, the calibration value may be applied to an intersection-over-union (IoU) threshold. For example, the post-processor may apply a calibration value for IoU threshold parameters to the IoU threshold.

At block 732, the IoU value for two bounding boxes may be compared to the IoU threshold. For example, the post-processor may compare the IoU value between bounding boxes for the same object in adjacent frames from the field object detector to the calibrated IoU threshold as at least one factor in determining a calibrated detection event at block 738.

At block 734, the calibration value may be applied to a sensitivity threshold. For example, the post-processor may apply a calibration value for motion sensitivity threshold parameters to the sensitivity threshold.

At block 736, the motion value for a detected object may be compared to the sensitivity threshold. For example, the post-processor may compare the motion value for the video frame to the calibrated motion sensitivity threshold as at least one factor in determining a calibrated detection event at block 738.

At block 738, a calibrated detection event may be determined. For example, event logic may include evaluation of one or more of the calibrated threshold parameters and other conditions for triggering an object detection event.

At block 740, an object detection event notification may be sent. For example, event logic may generate an object detection event notification in response to the calibrated detection event at block 738.

Figure 8:
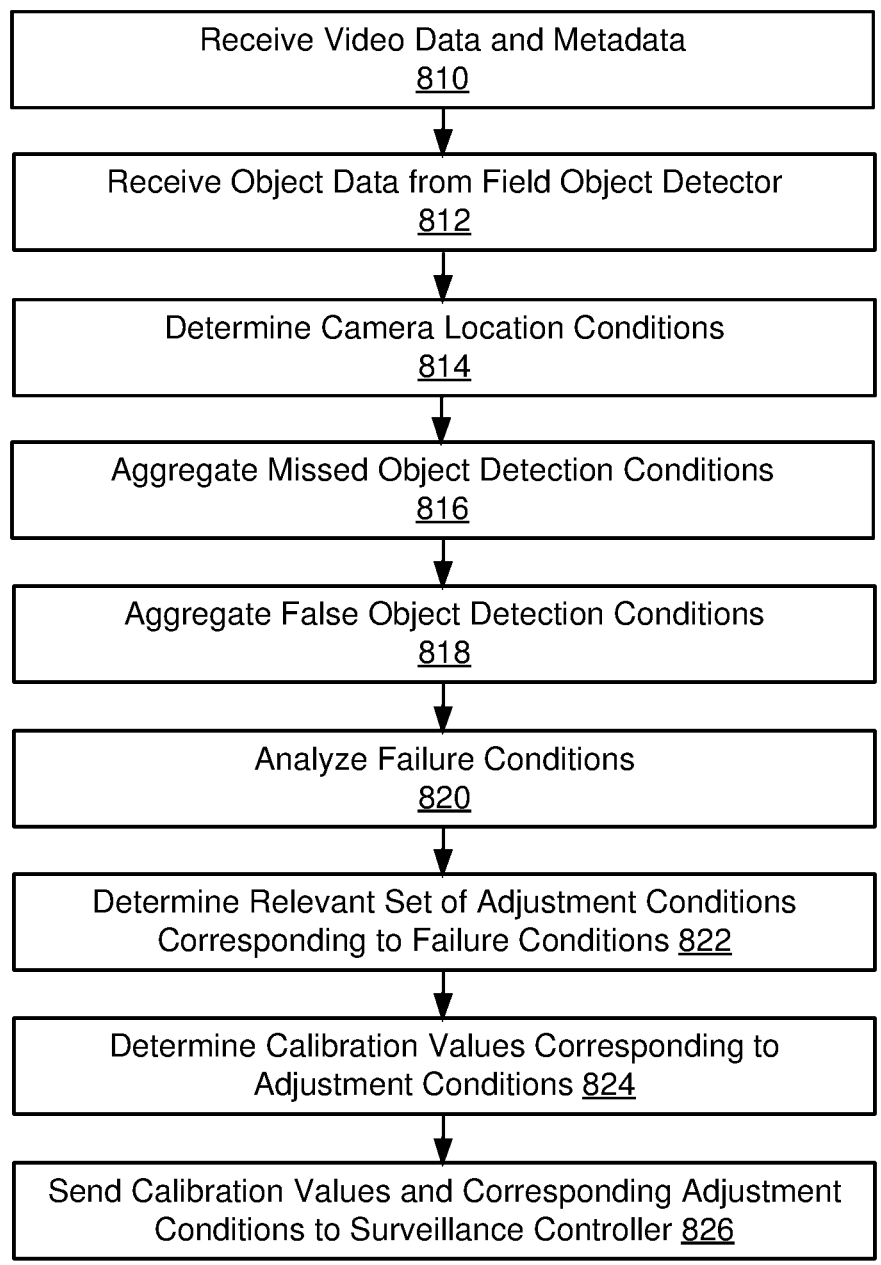
FIG. 8 is a flowchart of an example method of determining calibration values for different adjustment conditions.

As shown in FIG. 8, surveillance system 300 may be operated according to an example method for determining calibration values for different adjustment conditions, i.e., according to method 800 illustrated by blocks 810-826 in FIG. 8.

At block 810, video data and metadata may be received. For example, a calibration controller may receive video data and corresponding metadata from a surveillance controller.

At block 812, object data may be received from a field object detector. For example, the calibration controller may receive output data from the field object detector in the surveillance controller.

At block 814, camera location conditions may be determined. For example, one or more potentially relevant location conditions may be determined from the received metadata, object data, and/or analysis of the video data, such as for lighting conditions or areas of video frame.

At block 816, missed object detection conditions may be aggregated. For example, a failure analysis engine may aggregate conditions related to each missed object detection event.

At block 818, false object detection conditions may be aggregated. For example, the failure analysis engine may aggregate conditions related to each false object detection event.

At block 820, failure conditions may be analyzed. For example, the failure analysis engine may use statistical modeling and/or cluster analysis to group related failure events and determine patterns in related threshold parameters and conditions.

At block 822, a relevant set of adjustment conditions corresponding to failure conditions may be determined. For example, the failure analysis engine may determine which camera location conditions impact the performance of object detection by the field object detector.

At block 824, calibration values may be determined corresponding to the adjustment conditions. For example, the failure analysis engine may determine a set of calibration values corresponding to the adjustment conditions determined at block 822 and corresponding parameter thresholds for improving object detector performance.

At block 826, calibration values and corresponding adjustment conditions may be sent to the surveillance controller. For example, the calibration controller may send the determined calibration values and the adjustment conditions for selecting those calibration values to the surveillance controller for use in post-processing during normal operations.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

The invention claimed is:

1. A system, comprising:
   a video image sensor; and
   a surveillance controller configured to:
   receive video data from the video image sensor, wherein the video data includes a video stream of video frames captured by the video image sensor at a camera location;
   determine, during a calibration period, at least one calibration value for the camera location by:
   determining, using a field object detector based on a first object detection model, field object data for a plurality of calibration objects;
   determining, based on an object verification detector using a second object detection model, verification object data for the plurality of calibration objects, wherein:
   the first object detection model has a first accuracy value for objects of interest;
   the second object detection model has a second accuracy value for objects of interest; and
   the second accuracy value is higher than the first accuracy value;
   comparing the field object data from the field object detector to the verification object data for the plurality of calibration objects;
   determining, based on the comparison of the field object data to the verification object data, whether the verification object data matches the field object data;
   determining, responsive to the verification object data including objects of interest not in the field object data, missed object detection conditions;
   determining, responsive to the field object data including objects of interest not in the verification object data, false object detection conditions; and
   determining, based on the comparison of the field object data and the verification object data, the at least one calibration value to compensate for a failure condition of the first object detection model, wherein the failure condition is selected from the missed object detection conditions and the false object detection conditions;
   determine, using the field object detector during an operating period:
   object data for a detected object in the video data; and
   a confidence score for the detected object;
   post-process, during the operating period, the object data and the confidence score to determine a calibrated detection event, wherein post-processing includes applying the at least one calibration value for the camera location to determine the calibrated detection event; and
   send, responsive to the calibrated detection event, an event notification to a video surveillance application.

2. The system of claim 1, further comprising:
   a calibration controller comprising the object verification detector and configured to:
   receive, during the calibration period, calibration video data from the video image sensor at the camera location;
   receive, during the calibration period, the field object data for the plurality of calibration objects;
   determine, using the object verification detector, the verification object data for the plurality of calibration objects in the calibration video data;

determine, based on the comparison of the field object data and the verification object data:
the false object detection conditions determined by the field object detector; and
the missed object detection conditions determined by the field object detector; and
determine, based on the false object detection conditions and the missed object detection conditions, the at least one calibration value for post-processing the object data and the confidence score for the detected object during the operating period.

3. The system of claim 2, further comprising:
a video camera housing, wherein the video camera housing encloses:
the video image sensor;
the surveillance controller; and
a network interface configured to communicate with a network, wherein the surveillance controller is further configured to:
send, to the calibration controller and over the network:
the field object data; and
the calibration video data from the video image sensor; and
receive, from the calibration controller and over the network, the at least one calibration value determined based on the calibration period.

4. The system of claim 2, wherein:
the second object detection model of the object verification detector includes:
a motion model configured to determine a bounding box of moving objects in the calibration video data; and
an image classifier configured to detect an object of interest in the calibration video data; and
the calibration controller is further configured to:
compare bounding boxes of moving objects to detected objects from the field object data;
determine whether the object of interest is present in unmatched bounding boxes; and
determine, responsive to the image classifier detecting the object of interest in unmatched bounding boxes, the missed object detection conditions.

5. The system of claim 2, wherein:
the second object detection model of the object verification detector includes an image classifier configured to detect an object of interest in the calibration video data; and
the calibration controller is further configured to:
determine whether the object of interest is absent in the field object data; and
determine, responsive to the image classifier not detecting the object of interest in the field object data, the false object detection conditions.

6. The system of claim 2, wherein:
the second object detection model of the object verification detector includes:
a tracking model configured to determine a bounding box of an object of interest in successive frames in the calibration video data; and
an image classifier configured to detect the object of interest in the calibration video data; and
the calibration controller is further configured to:
compare bounding boxes in successive frames to detected objects from the field object data;
determine whether the object of interest is present in unmatched bounding boxes; and
determine, responsive to the image classifier detecting the object of interest in unmatched bounding boxes, the missed object detection conditions.

7. The system of claim 2, wherein:
the second object detection model is configured to determine
verification confidence scores for the detected objects; and
the calibration controller is further configured to execute, for the surveillance controller:
comparing the field object data to the verification object data for the detected objects;
determining, based on the comparison of the field object data to the verification object data, whether the verification object data matches the field object data;
determining, responsive to the verification object data including objects of interest not in the field object data, the missed object detection conditions; and
determining, responsive to the field object data including objects of interest not in the verification object data, the false object detection conditions.

8. The system of claim 2, wherein:
the calibration controller is further configured to selectively receive, during the operating period:
the video data from the video image sensor; and
the field object data;
the surveillance controller is further configured to evaluate verification conditions for sending data to the calibration controller; and
the verification conditions are selected from:
object verification scores from the field object detector meeting a verification threshold; and
periodic sampling of the video stream.

9. The system of claim 2, wherein:
the calibration controller is further configured to:
aggregate the missed object detection conditions;
aggregate the false object detection conditions;
determine a set of adjustment conditions associated with the camera location; and
determine, based on failure analysis, a plurality of calibration values corresponding to a plurality of adjustment conditions in the set of adjustment conditions; and
the surveillance controller is further configured to:
determine a current adjustment condition at the camera location; and
determine, using the current adjustment condition at the camera location, the at least one calibration value from the plurality of calibration values.

10. The system of claim 1, wherein the surveillance controller is further configured to:
apply the at least one calibration value to a confidence score threshold; and
compare the confidence score for the detected object to the confidence score threshold to determine the calibrated detection event.

11. The system of claim 1, wherein the surveillance controller is further configured to:
apply the at least one calibration value to a bounding box size threshold; and
compare a bounding box size for the detected object to the bounding box size threshold to determine the calibrated detection event.

12. The system of claim 1, wherein the surveillance controller is further configured to:
apply the at least one calibration value to an intersection-over-union threshold; and
compare an intersection-over-union value for the detected object to the intersection-over-union threshold to determine the calibrated detection event.

13. The system of claim 1, wherein the surveillance controller is further configured to:
apply the at least one calibration value to a motion model sensitivity threshold; and
compare a motion value for the detected object to the motion model sensitivity threshold to determine the calibrated detection event.

14. The system of claim 1, wherein:
the surveillance controller is further configured to:
determine a set of adjustment conditions for the camera location;
determine a plurality of calibration values for determining the calibrated detection event;
map the set of adjustment conditions to the plurality of calibration values;
determine a current adjustment condition at the camera location; and
determine, using the current adjustment condition to index the set of adjustment conditions, the at least one calibration value from the plurality of calibration values; and
the set of adjustment conditions are selected from condition types including:
relative object size;
location in video frame;
time;
light condition; and
weather condition.

15. A computer-implemented method, comprising:
receiving video data from a video image sensor, wherein the video data includes a video stream of video frames captured by the video image sensor at a camera location;
determining, during a calibration period, at least one calibration value for the camera location by:
determining, using a field object detector based on a first object detection model, field object data for a plurality of calibration objects in calibration video data from the video image sensor;
determining, based on an object verification detector using a second object detection model, verification object data for the plurality of calibration objects in the calibration video data, wherein:
the first object detection model has a first accuracy value for objects of interest;
the second object detection model has a second accuracy value for objects of interest; and
the second accuracy value is higher than the first accuracy value;
comparing the field object data from the field object detector to the verification object data for the plurality of calibration objects;
determining, based on the comparison of the field object data to the verification object data, whether the verification object data matches the field object data;
determining, responsive to the verification object data including objects of interest not in the field object data, missed object detection conditions;
determining, responsive to the field object data including objects of interest not in the verification object data, false object detection conditions; and
determining, based on the comparison of the field object data and the verification object data, the at least one calibration value to compensate for a failure condition of the first object detection model, wherein the failure condition is selected from the missed object detection conditions and the false object detection conditions;
determining, using the field object detector during an operating period:
object data for a detected object in the video data; and
a confidence score for the detected object;
post-processing, during the operating period, the object data and the confidence score to determine a calibrated detection event, wherein post-processing includes applying the at least one calibration value for the camera location to determining the calibrated detection event; and
sending, responsive to the calibrated detection event, an event notification to a video surveillance application.

16. The computer-implemented method of claim 15, further comprising:
determining, using the second object detection model, a bounding box of moving objects in the calibration video data;
detecting, using an object classifier, an object of interest in the calibration video data; and
comparing bounding boxes of moving objects to detected objects from the field object data;
determining whether the object of interest is present in unmatched bounding boxes; and
determining, responsive to detecting the object of interest in unmatched bounding boxes, the missed object detection conditions.

17. The computer-implemented method of claim 15, further comprising:
detecting, by the second object detection model, an object of interest in the calibration video data;
determining whether the object of interest is absent in the field object data; and
determining, responsive to not detecting the object of interest in the field object data, the false object detection conditions.

18. The computer-implemented method of claim 15, further comprising:
aggregating, during the calibration period, the missed object detection conditions;
aggregating, during the calibration period, the false object detection conditions;
determining a set of adjustment conditions associated with the camera location;
determining, based on failure analysis of aggregate missed object detection conditions and aggregate false object detection conditions, a plurality of calibration values corresponding to a plurality of adjustment conditions in the set of adjustment conditions;
determining, during the operation period, a current adjustment condition at the camera location; and
determining, using the current adjustment condition at the camera location, the at least one calibration value from the plurality of calibration values.

19. The computer-implemented method of claim 15, further comprising:
applying the at least one calibration value to a post-processing threshold; and comparing a corresponding value for the detected object to the post-processing threshold to determine the calibrated detection event, wherein the post-processing threshold is selected from:
a confidence score threshold;
a bounding box size threshold;
an intersection-over-union threshold; and
a motion model sensitivity threshold.

20. A video camera, comprising:
a video image sensor;
means for receiving video data from the video image sensor, wherein the video data includes a video stream of video frames captured by the video image sensor at a camera location;
means for determining, during a calibration period, at least one calibration value for the camera location by:
determining, using a field object detector based on a first object detection model, field object data for a plurality of calibration objects;
determining, based on an object verification detector using a second object detection model, verification object data for the plurality of calibration objects, wherein:
the first object detection model has a first accuracy value for objects of interest;
the second object detection model has a second accuracy value for objects of interest; and
the second accuracy value is higher than the first accuracy value;
comparing the field object data from the field object detector to the verification object data for the plurality of calibration objects;
determining, based on the comparison of the field object data to the verification object data, whether the verification object data matches the field object data;
determining, responsive to the verification object data including objects of interest not in the field object data, missed object detection conditions;
determining, responsive to the field object data including objects of interest not in the verification object data, false object detection conditions; and
determining, based on the comparison of the field object data and the verification object data, the at least one calibration value to compensate for a failure condition of the first object detection model, wherein the failure condition is selected from the missed object detection conditions and the false object detection conditions;
means for determining, using the field object detector during an operating period:
object data for a detected object in the video data; and
a confidence score for the detected object;
means for post-processing, during the operating period, the object data and the confidence score to determine a calibrated detection event, wherein post-processing includes applying the at least one calibration value for the camera location to determining the calibrated detection event; and
means for sending, responsive to the calibrated detection event, an event notification to a video surveillance application.

* * * * *